(12) United States Patent
Kobayashi et al.

(10) Patent No.: US 6,838,855 B2
(45) Date of Patent: Jan. 4, 2005

(54) METHOD AND APPARATUS FOR CONTROLLING MOTOR

(75) Inventors: Nobutsune Kobayashi, Kanagawa (JP); Michiharu Shoji, Kanagawa (JP); Hiroyuki Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 10/144,736

(22) Filed: May 15, 2002

(65) Prior Publication Data

US 2002/0172510 A1 Nov. 21, 2002

(30) Foreign Application Priority Data

May 17, 2001 (JP) ....................................... 2001-148341

(51) Int. Cl.⁷ .......................... G05B 11/01; G05B 13/00; G05B 19/00; G05B 11/18
(52) U.S. Cl. ....................... 318/800; 318/560; 318/561; 318/567; 318/590
(58) Field of Search ................................ 318/800, 560, 318/652, 567, 568.17, 568.18, 592, 651, 561, 590, 638, 667, 635

(56) References Cited

U.S. PATENT DOCUMENTS

| 3,972,280 A | * | 8/1976 | Swatik et al. ............. 101/93.16 |
| 4,146,922 A | | 3/1979 | Brown et al. |
| 4,488,098 A | * | 12/1984 | Shimonou .................. 318/561 |
| 4,490,796 A | | 12/1984 | Bigbie et al. |
| 4,524,364 A | * | 6/1985 | Bain et al. ..................... 347/39 |
| 4,551,664 A | * | 11/1985 | Wong et al. ................. 318/592 |
| 4,862,284 A | * | 8/1989 | Murata ........................ 358/451 |
| 4,869,610 A | | 9/1989 | Nishizawa et al. |
| 4,888,536 A | * | 12/1989 | Sakai et al. ................. 318/592 |
| 4,988,935 A | * | 1/1991 | York ....................... 318/568.18 |
| 5,122,003 A | * | 6/1992 | Matsumoto et al. ........ 400/248 |
| 5,191,568 A | * | 3/1993 | Muto et al. ............... 360/77.08 |
| 5,207,520 A | | 5/1993 | Tanaka |
| 5,255,136 A | * | 10/1993 | Machado et al. ........ 360/77.02 |
| 5,325,028 A | * | 6/1994 | Davis ......................... 318/560 |
| 5,331,264 A | * | 7/1994 | Cheng et al. .......... 318/568.11 |
| 5,398,221 A | * | 3/1995 | Ogawa ..................... 369/30.15 |
| 5,526,201 A | * | 6/1996 | Takata et al. ............. 360/77.04 |
| 5,559,412 A | * | 9/1996 | Schuler ...................... 318/561 |
| 5,781,451 A | * | 7/1998 | Lofthus et al. ............... 702/94 |
| 5,804,941 A | * | 9/1998 | Ray ........................... 318/569 |
| 5,998,956 A | | 12/1999 | Saito |
| 6,014,285 A | * | 1/2000 | Okamura ................. 360/78.04 |
| 6,065,830 A | | 5/2000 | Hiramatsu et al. |
| 6,114,825 A | * | 9/2000 | Katz ........................ 318/615 |
| 6,166,876 A | * | 12/2000 | Liu ......................... 360/78.04 |
| 6,429,996 B1 | * | 8/2002 | Iwashiro .................. 360/78.07 |

(List continued on next page.)

FOREIGN PATENT DOCUMENTS

| EP | 0 312 324 | 4/1989 |
| EP | 0 373 558 | 6/1990 |
| EP | 0 666 179 | 8/1995 |
| JP | 64-26386 | 1/1989 |
| JP | 9-95023 | 4/1997 |
| JP | 9-202014 | 8/1997 |
| JP | 2000-56634 | 2/2000 |
| JP | 2001-246827 | 9/2001 |

*Primary Examiner*—Bentsu Ro
*Assistant Examiner*—Patrick Miller
(74) *Attorney, Agent, or Firm*—Fitzpatrick, Cella, Harper & Scinto

(57) ABSTRACT

In controlling a motor in a device which drives a mechanism using the motor as a power source, in executing driving, an ideal profile of the driving is generated in accordance with a target position and a preset initial parameter, driving of the motor is controlled in accordance with the profile, the value of the initial parameter is evaluated at the end of driving, and the value of the initial parameter is changed in accordance with the evaluation result. High-speed accurate position control can be achieved independently of the characteristic of an individual motor to be used.

14 Claims, 30 Drawing Sheets

U.S. PATENT DOCUMENTS

| | | | |
|---|---|---|---|
| 6,498,698 B1 | * 12/2002 | Golowka et al. | 360/78.12 |
| 6,554,395 B2 | * 4/2003 | Cole et al. | 347/37 |
| 2002/0171702 A1 | * 11/2002 | Kobayashi et al. | 347/19 |
| 2002/0172511 A1 | * 11/2002 | Saito et al. | 388/800 |
| 2003/0039047 A1 | * 2/2003 | Ottesen et al. | 360/48 |
| 2003/0062867 A1 | * 4/2003 | Kobayashi | 318/560 |
| 2003/0095354 A1 | * 5/2003 | Atsumi et al. | 360/78.06 |

* cited by examiner

METHOD AND APPARATUS FOR CONTROLLING MOTOR

FIELD OF THE INVENTION

The present invention relates to a method and apparatus for controlling a motor and, more particularly, to positioning executed when a mechanism is driven using a motor as a power source.

BACKGROUND OF THE INVENTION

Currently, motors are used as power sources of various apparatuses. Especially, many OA devices and home electric appliances use DC motors because they have simple structures, require no maintenance, generate little rotation variation and vibration, and are capable of high-speed operation and accurate control.

In recent years, printers, and especially general commercial printers that are often for home use, are required to have not only higher image quality but also lower operation noise. Noise generated in operation includes that generated in printing and that generated in driving mechanical portions. In inkjet printing apparatuses which have only a few noise sources in printing, noise generated in driving mechanical portions is reduced.

An inkjet printing apparatus has, as its main mechanical portions, a printhead scanning mechanism and a printing medium convey mechanism. Noise is reduced by using a DC motor and linear encoder as a driving means for the printhead scanning mechanism. Today, a DC motor and rotary encoder are also being employed as a driving means for the printing medium convey mechanism in many cases.

From the viewpoint of noise reduction, an effect can be expected when a DC motor is employed. From the viewpoint of accurate printing medium conveyance, more advanced position control is required in addition to a mechanical accuracy.

To control the position of a DC motor, the motor is basically powered off when the rotation (angle) of a roller has reached a target position, thereby stopping the motor by inertia.

To ensure stop position accuracy in a mechanism using a DC motor, deceleration before stop and removal of disturbance torque before stop (i.e., stable low-speed operation immediately before stop) are indispensable. When the motor is powered off at a constant and sufficiently low speed, the settling time until stop and stop position accuracy can be stabilized.

In such an arrangement using a DC motor, the torque variation must be reduced as much as possible for accurate control.

A torque variation with a long period can be controlled because disturbance torque can be removed by feedback control represented by generally known PID control. However, it is difficult to control a torque variation with a short period represented by cogging. This is because the torque variation is caused by the object to be controlled, i.e., the motor itself, and in high-speed driving, the frequency exceeds the frequency solvable by feedback control.

A torque variation due to cogging of a DC motor will be described below with reference to FIGS. 1 to 3.

FIG. 1 is a graph simply showing a speed variation when a DC motor is driven at a constant speed. The abscissa indicates time, and the ordinate indicates the speed. Reference numeral 1001 denotes a speed profile obtained when the motor is driven at a speed (V_x) that is assumed to be a reference speed here; 1002, a speed profile obtained when the motor is driven at a speed twice the reference speed (2*V_x), and 1003, a speed profile obtained when the motor is driven at a speed eight times the reference speed (8*V_x).

A torque variation is generated by cogging as an essential characteristic due to the operation principle of the DC motor, and a periodical speed variation is generated. The periodical speed variation is caused by the characteristic of the motor itself. For this reason, this speed variation is always generated every moving distance corresponding to a predetermined rotational angle. Hence, the higher the speed becomes, the higher the frequency at which the variation occurs becomes.

A point 1004 indicated by ● in FIG. 1 corresponds to a phase angle at which the motor itself rotates at a high speed due to the influence of the torque variation caused by cogging. A point 1005 indicated by ■ in FIG. 1 corresponds to a phase angle at which the motor itself rotates at a low speed due to the influence of the torque variation caused by cogging.

When the motor is driven at the speed 2*V_x twice the reference speed V_x, the speed variation is generated at a twofold frequency. When the motor is driven at the eight-fold speed 8*V_x, the speed variation is generated at an eight-fold frequency.

The influence of a torque variation due to cogging in actual driving will be described next.

FIG. 2 is a timing chart for explaining the influence of a torque variation due to cogging by exemplifying ideal position profile tracking control and ideal speed profile tracking control used for a DC motor.

Referring to FIG. 2, the abscissa indicates time, an ordinate 2001 indicates the speed, and an ordinate 2002 indicates the position.

Reference numeral 2003 denotes an ideal position profile; and 2004, an ideal speed profile. The ideal speed profile 2004 is formed from four control regions: an acceleration control region 2011, constant speed control region 2012, deceleration control region 2013, and positioning control region 2014.

In the ideal speed profile 2004, V_START indicates an initial speed, V_FLAT indicates a speed in the constant speed control region 2012, V_APPROACH indicates a speed in the positioning control region, V_PROMISE indicates a maximum speed immediately before stop, which must be always kept to achieve the positioning accuracy, and v_stop indicates a speed immediately before stop as an actual value that changes to any value due to disturbance when actual driving is assumed.

In consideration of a speed variation in actual driving, the speed V_APPROACH must be set to a sufficiently small value such that the speed v_stop does not exceed the value V_PROMISE for any variation in speed.

In this example, position servo is employed in the regions 2011, 2012, and 2013, and speed servo is employed in the region 2014, as will be described later. The curve 2003 shown in FIG. 2 represents an ideal position profile in position servo, or in speed servo, a supposed arrival position profile in operation according to the ideal speed profile. The curve 2004 shown in FIG. 2 represents an ideal speed profile in speed servo, or in position servo, a required speed profile obtained for follow-up operation to the ideal position profile.

Reference numeral 2005 indicates an actual driving speed profile of the physical motor when variations at a high frequency due to cogging are averaged to facilitate comparison with the ideal speed profile 2004. When feedback control is executed using the ideal position profile 2003 as an input, the speed becomes closer to the ideal speed as the positioning control region 2014 comes close to the end, although a slight delay is generated with respect to the ideal speed profile 2004. The final speed immediately before stop converges to the speed V_APPROACH at which the positioning accuracy can be achieved. Note that the shift from the deceleration control region 2013 to the positioning control region 2014 is done at the moment when the position has reached S_APPROACH independently of the physical driving speed state.

The profile 2005 can be actually achieved when a motor that generates no torque variation due to cogging, e.g., an ultrasonic motor, is driven. In this case, however, it is assumed that a DC motor that generates a torque variation due to cogging is driven. Hence, the actual shape of the actual speed profile is indicated by 2006 or 2007 because the influence of the torque variation due to cogging is added to the profile 2005.

The profile 2006 indicates that the phase of the DC motor at the moving start time is opposite to that in the profile 2007. Actually, in addition to these two patterns, various patterns in which the positions of the point 1004 at which the speed increases due to the torque variation and point 1005 at which the speed decreases temporally change depending on the phase of the DC motor at the moving start time can be generated.

S_APPROACH in FIG. 2 indicates a position at which the deceleration control region 2013 changes to the positioning control region 2014. S_STOP indicates a stop position. T_ADD indicates a time required for the acceleration control region 2011. T_DEC indicates a time required for the deceleration control region 2013. T_FLAT indicates a time required for the constant speed control region 2012. The time T_FLAT has a fixed value determined when the stop position S_STOP when the moving start position is defined as 0 is set, i.e., when the ideal position profile 2003 with respect to the total moving distance is set.

T_APPROACH is a time required for the positioning control region 2014. T_APPROACH is a time required for the object to be controlled to move by a distance S_APR_STOP from the position S_APPROACH at which the positioning control region 2014 starts to the stop position S_STOP in actual movement. The profile 2005 shown in FIG. 2 models a case wherein the object to be drive-controlled has moved through the positioning region at the ideal speed. In actual control, however, the ideal physical operation is generally very difficult.

For high-speed accurate positioning, the curve of the ideal position profile 2003 must be tuned in accordance with the system. More specifically, the ideal position profile 2003 is preferably set such that the speed in the constant speed control region 2012 becomes as high as possible to shorten the positioning required time so far as the system performance permits, the speed in the positioning control region 2014 becomes as low as possible to improve the positioning accuracy so far as the system performance permits, and the lengths of the acceleration control region 2011, deceleration control region 2013, and positioning control region 2014 become as short as possible to shorten the positioning required time so far as the system performance permits.

However, a more detailed tuning method is irrelevant to the present invention. Here, a description will be made assuming that the ideal position profile 2003 has already been optimized.

As described above, the profiles 2006 and 2007 are speed profiles of the physical motor when similar control is executed using a DC motor having a torque variation due to cogging described with reference to FIG. 1. From a broader viewpoint, they form the same curve as the actual speed profile 2005 of an ideal motor. However, because of a speed variation by the influence of a torque variation due to cogging, the speed at the moment when the positioning control region 2014 starts is higher than the target speed V_APPROACH in the profile 2006 and lower in the profile 2007.

Due to this influence, the speed at the moment when the position has reached the stop position S_STOP exceeds the speed V_PROMISE in the profile 2006. Since this speed cannot satisfy stop conditions required of the apparatus, the stop position accuracy is not guaranteed, and overrun from the stop position may occur.

On the other hand, in the profile 2007, the average speed in the positioning control region 2014 is low. Hence, the actual time until the stop position S_STOP becomes longer than T_APPROACH, and the required time is prolonged.

The problem of the stop position in the profile 2006 can easily be solved by making the speed in shifting to the positioning control region less than the default value V_APPROACH. In this case, however, if the profile has changed to the profile 2007 due to the phase of the motor at the moving start time, the problem that the required time is prolonged becomes more serious.

Conversely, the problem of the required time in the profile 2007 can easily be solved by making the speed in shifting to the positioning control region more than the default value V_APPROACH. In this case, however, if the profile has changed to the profile 2006 due to the phase of the motor at the moving start time, the problem that the stop position accuracy is not guaranteed becomes more serious.

The cogging of a DC motor has a period. However, this period is difficult to accurately detect. Although the torque variation is approximately indicated by a sine curve in FIG. 2, an actual torque variation varies depending on each individual motor and exhibits various characteristics that cannot be expressed by any sine curve. For this reason, even motors of the same type and model exhibit no identical torque variation characteristics. No curve (profile) that can be completely universally applied to all motors for all purposes is present.

Control may be executed while linking logical position information read from an encoder to a phase angle when the period of torque ripple due to cogging is regarded as 360°. In this case, however, the logical position information is initialized every time the apparatus is powered off. For this reason, it is difficult to execute control while predicting in advance whether the speed at the stop position in moving after power-on of the apparatus exceeds the final target speed, as indicated by 2006, or becomes lower than the final target speed, as indicated by 2007.

As described above, it is very difficult in fact to set the target speed (V_APPROACH) in the positioning control region in accordance with the cogging characteristic of a DC motor to be used, and to achieve high-speed accurate position control.

SUMMARY OF THE INVENTION

The present invention has been made in consideration of the above situation, and has as its object to provide a method and apparatus for controlling a motor, which can achieve high-speed accurate position control independently of a variation in characteristic due to an individual difference of a motor to be used, attachment of a mechanism, or cogging related to a phase angle.

In order to achieve the above object, a motor control method according to an aspect of the present invention is a motor control method in a device which drives a mechanism using a motor as a power source, characterized by comprising: the profile generation step of, in executing driving, generating an ideal profile of the driving in accordance with a target position and a preset initial parameter; the tracking control step of controlling driving of the motor in accordance with the profile; and the evaluation step of, at an end of the driving, evaluating a value of the initial parameter and changing the value of the initial parameter in accordance with a result of evaluation.

In order to achieve the above object, a motor control apparatus according to another aspect of the present invention is a motor control apparatus for driving a mechanism using a motor as a power source, characterized by comprising: profile generation means for, in executing driving, generating an ideal profile of the driving in accordance with a target position and a preset initial parameter; tracking control means for controlling driving of the motor in accordance with the profile; and evaluation means for, at an end of the driving, evaluating a value of the initial parameter and changing the value of the initial parameter in accordance with a result of evaluation.

That is, in the present invention, when a motor is to be controlled in a device which drives a mechanism using the motor as a power source, an ideal profile of each driving is generated in accordance with the target position and preset initial parameters. Driving of the motor is controlled in accordance with the profile. In ending each driving, the values of the initial parameters are evaluated. The values of the initial values are changed in accordance with the evaluation result.

With this arrangement, when the characteristic varies due to the individual difference of the motor to be used, attachment of the mechanism, or cogging related to the phase angle, a profile corresponding to the characteristic is generated, and control according to the profile is executed.

Hence, high-speed accurate position control can be achieved independently of the characteristic of the individual motor to be used.

Preferably, the method further comprises the storage step of storing a value in actual driving, which corresponds to the initial parameter, in the tracking control step, and in the evaluation step, it is determined whether a difference between the value stored in the storage step and the value of the initial parameter is larger than a predetermined value, and if it is determined that the difference is larger than the predetermined value, the initial parameter is changed.

Preferably, in the profile generation step, an ideal position profile representing a relationship between time and a position and an ideal speed profile representing a relationship between time and a speed are generated, and in the tracking control step, the driving is controlled in four regions including an acceleration region, a constant speed region, deceleration region, and a positioning region, the motor is driven in accordance with the ideal position profile in the acceleration region, constant speed region, and deceleration region, and the motor is driven in accordance with the ideal speed profile in the positioning region.

Preferably, the initial parameter includes a set required time of the positioning region and a set speed in the positioning region, and in the evaluation step, it is determined whether a difference between an actual required time and the set required time of the positioning region is larger than a predetermined value, and if it is determined that the difference is larger than the predetermined value, the set speed is changed.

Alternatively, the initial parameter includes a set required time of the positioning region and a set moving distance of the positioning region, and in the evaluation step, it is determined whether a difference between an actual required time and the set required time of the positioning region is larger than a predetermined value, and if it is determined that the difference is larger than the predetermined value, the set moving distance is changed.

Alternatively, the initial parameter includes a set required time of the positioning region, a set speed in the positioning region, and a set moving speed of the positioning region, and in the evaluation step, it is determined whether a difference between an actual required time and the set required time of the positioning region is larger than a predetermined value, and if it is determined that the difference is larger than the predetermined value, at least one of the set speed and the set moving distance is changed.

In that case, in the evaluation step, if it is determined that the difference is larger than the predetermined value, the set speed is changed, and if the changed set speed is smaller than a predetermined threshold value, the set speed is returned to the initial value, and the set moving distance is changed.

Preferably, the motor is a DC motor, and a plurality of values of initial parameters are prepared in correspondence with phase angles of the DC motor.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

A serial inkjet printer having a printhead with a detachable ink tank will be exemplified.

[First Embodiment]

In the first embodiment, the motor control method of the present invention is applied to control a line feed motor for printing medium conveyance.

Figure 3:
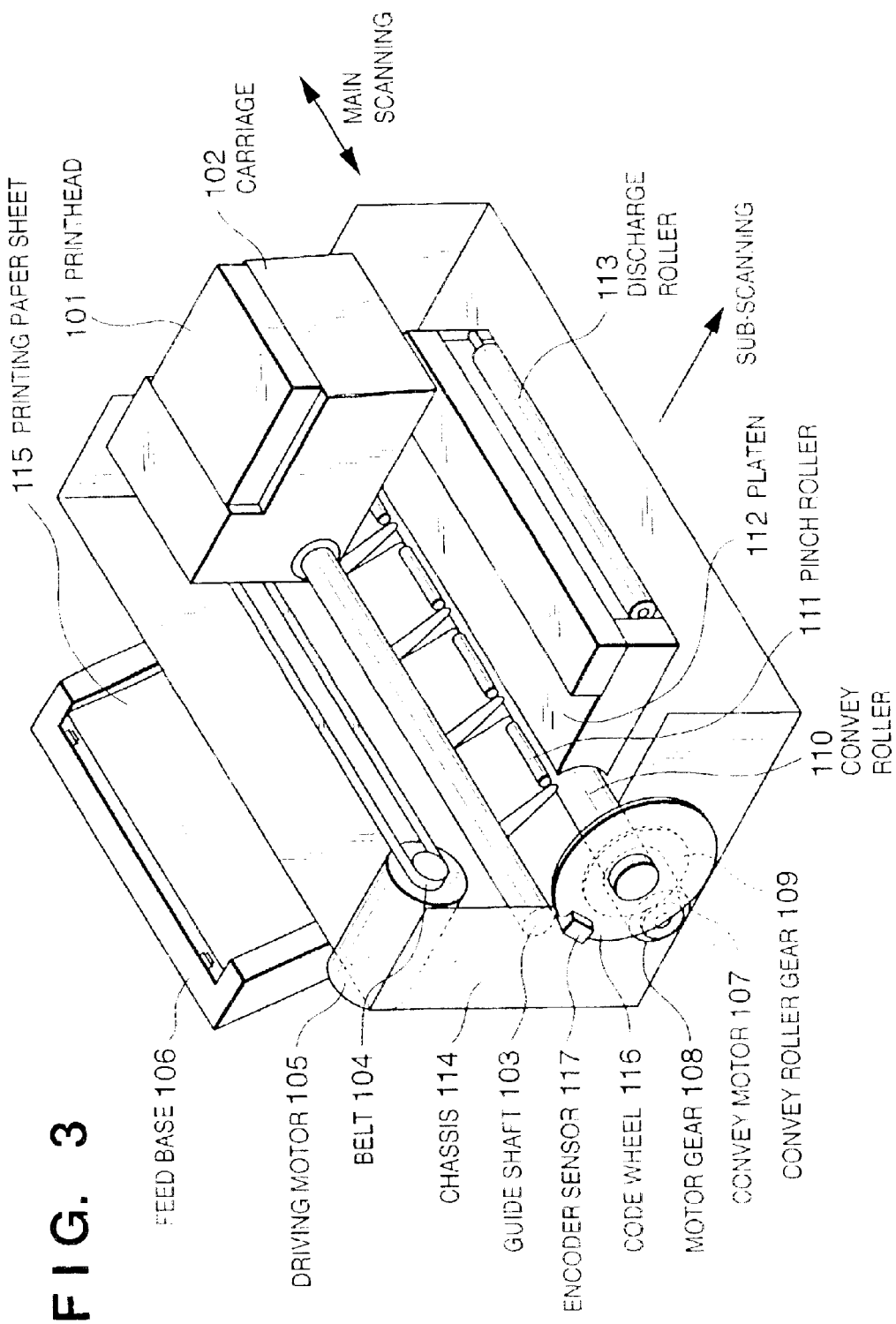
FIG. 3 is a perspective view showing the overall arrangement of a serial inkjet printer according to an embodiment of the present invention.

FIG. 3 is a perspective view showing the overall arrangement of the serial inkjet printer. Referring to FIG. 3, a printhead 101 has an ink tank. The printhead 101 is mounted on a carriage 102. A guide shaft 103 is inserted to the bearing portion of the carriage 102 so as to be slidable in the main scanning direction. The two ends of the shaft are fixed to a chassis 114. A driving motor 105 serving as a carriage driving means transmits driving power through a belt 104 serving as a carriage drive transmission means engaged with the carriage 102 so that the carriage 102 can move in the main scanning direction.

In a printing standby state, printing paper sheets 115 are stacked on a feed base 106. At the start of printing, a printing paper sheet is fed by a feed roller (not shown). To convey the fed printing paper sheet, a convey roller is rotated by the driving force of a paper convey motor (107), i.e., a DC motor through a gear train (motor gear 108 and convey roller gear 109) serving as a transmission means. The printing paper sheet 115 is conveyed by an appropriate feed amount by a convey roller 110 and pinch rollers 111 that are pressed by the convey roller 110 and make follow-up rotation. The convey amount is managed by detecting and counting, with an encoder sensor 117, slits of a code wheel (rotary encoder film 116) pressed and fitted into the convey roller gear 109. Hence, accurate feeding is possible.

Figure 4:
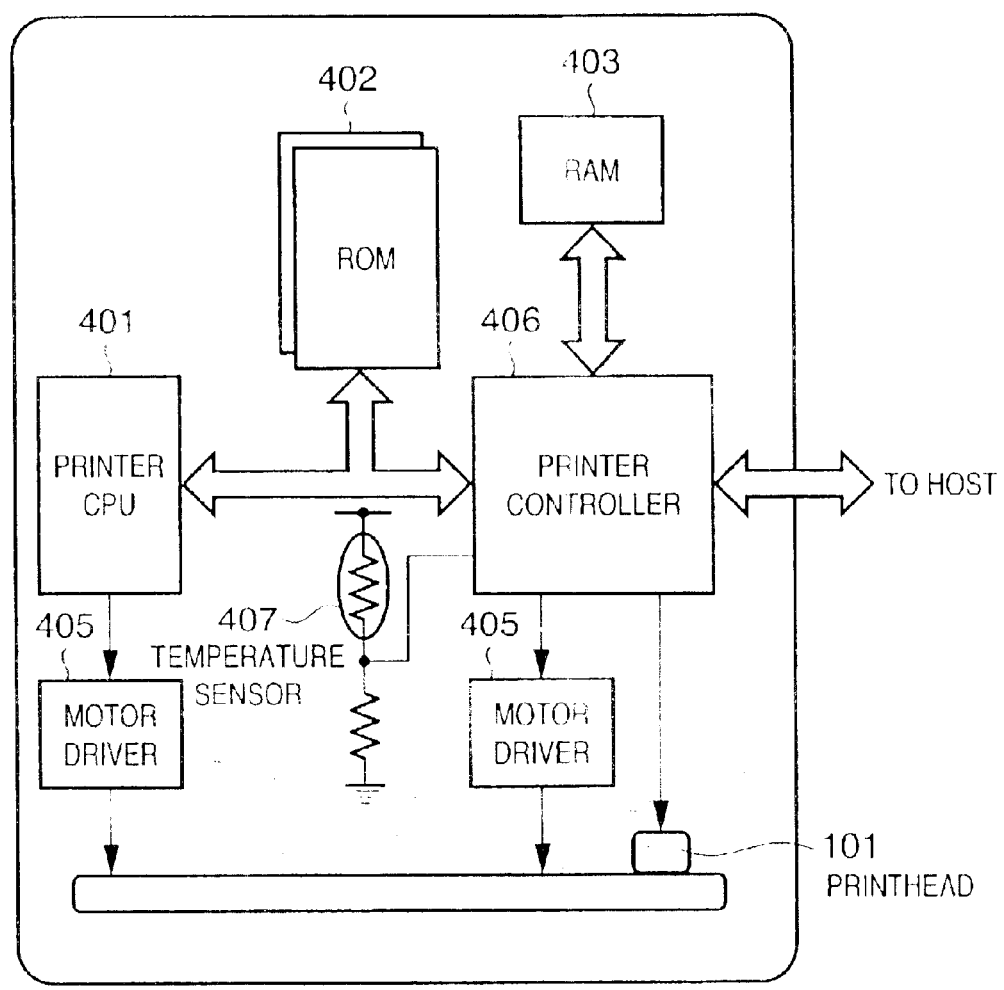
FIG. 4 is a block diagram for explaining the control arrangement of the printer shown in FIG. 3.

FIG. 4 is a block diagram for explaining the control arrangement of the printer shown in FIG. 3.

Referring to FIG. 4, reference numeral 401 denotes a CPU for controlling the printer of the printer apparatus. The CPU 401 controls printing processing using a printer control program stored in a ROM 402 or printer emulation and print fonts.

A RAM 403 stores rasterized data for printing or received data from a host. Reference numeral 404 denotes a printer head; and 405, a motor driver. A printer controller 406 controls access to the RAM 403, exchanges data with the host apparatus, and sends a control signal to the motor driver. A temperature sensor 407 formed from a thermistor or the like detects the temperature of the printer apparatus.

The CPU 401 reads out from the I/O data register in the printer controller 406 information such as an emulation command sent from the host apparatus to the printer apparatus and writes/reads control corresponding to the command in/from the I/O register and I/O port in the printer controller 406, while mechanically and electrically controlling the main body in accordance with the control program in the ROM 402.

Figure 5:
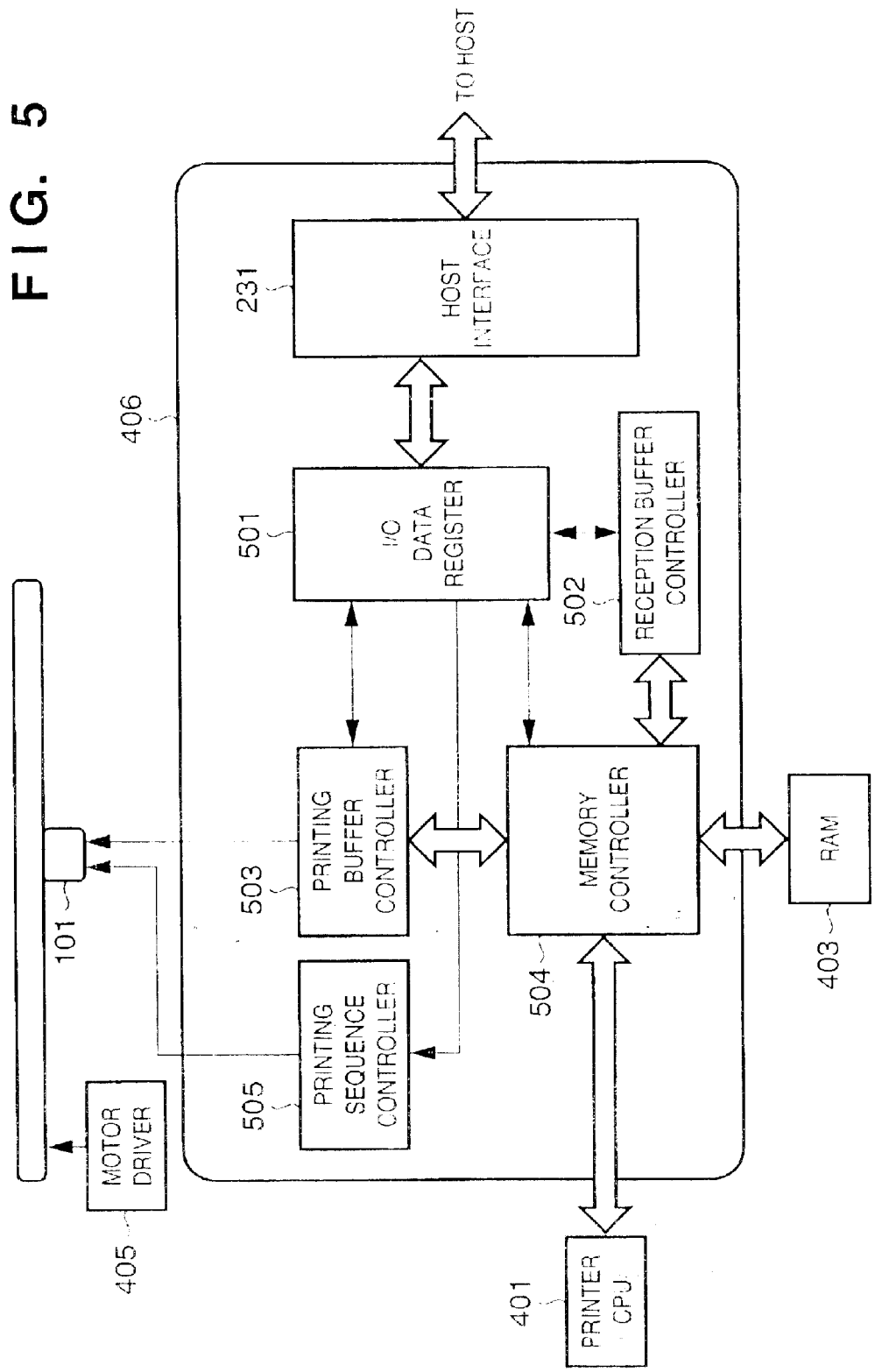
FIG. 5 is a block diagram for explaining the detailed arrangement of a printer controller shown in FIG. 4.

FIG. 5 is a block diagram for explaining the detailed arrangement of the printer controller 406 shown in FIG. 4. The same reference numerals as in FIG. 4 denote the same parts in FIG. 5.

Referring to FIG. 5, an I/O register 501 exchanges data with the host at the command level. A reception buffer controller 502 directly writes received data from the register in the RAM 403.

In printing, a printing buffer controller 503 reads out print data from the print data buffer of the RAM and sends the data to the printer head 404. A memory controller 504 controls three-directional memory access with respect to the RAM 403. A printing sequence controller 505 controls a printing sequence. A host interface 231 communicates with the host.

Figure 6:
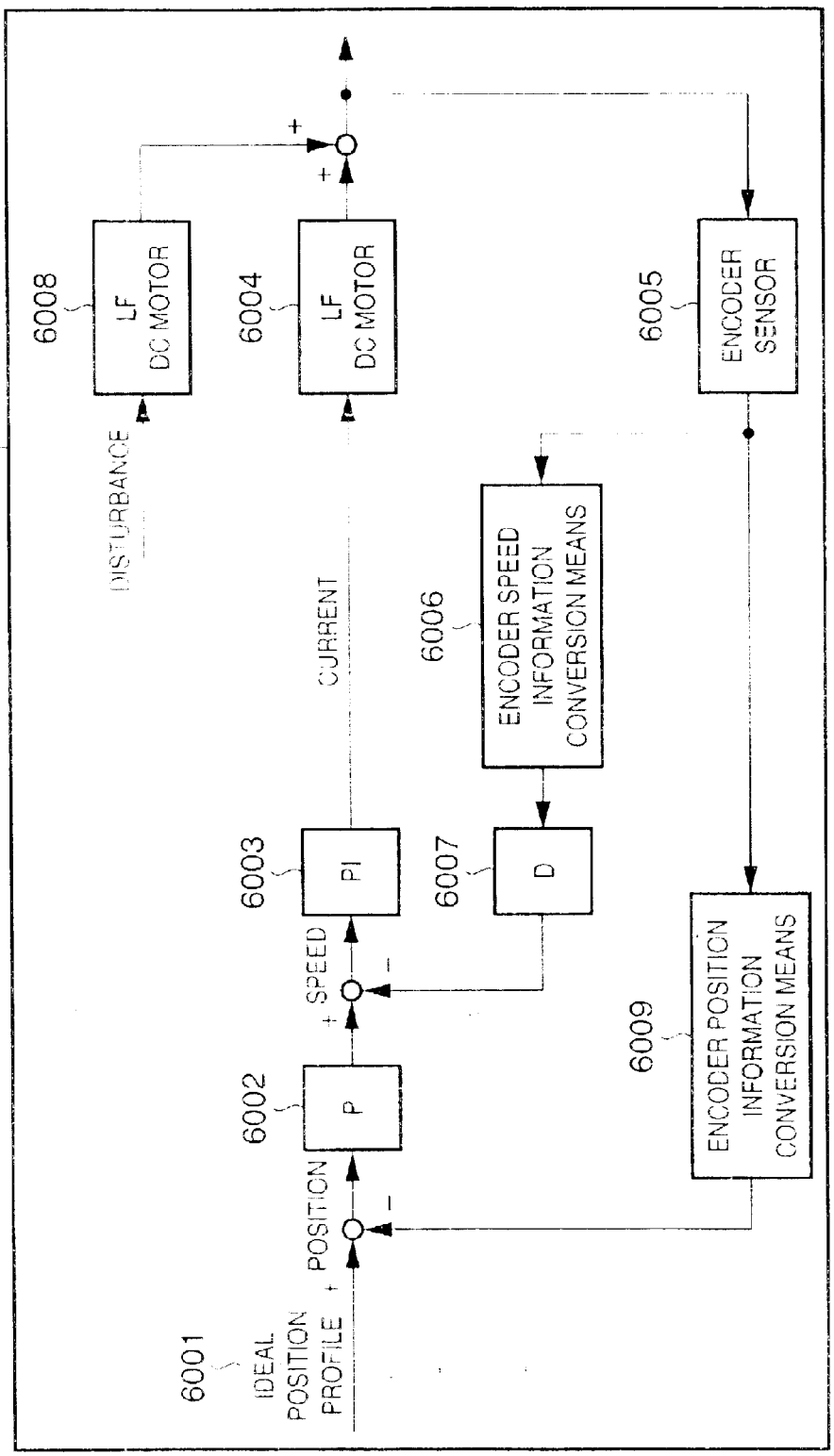
FIG. 6 is a block diagram showing a control procedure by position servo of a general DC motor.

FIG. 6 is a block diagram showing a control procedure (6000) so as to explain the position control system of a general DC motor. In this embodiment, position servo is used in the acceleration control region, constant speed control region, and deceleration control region. Such DC motor control is done by a method called PID control or classic control. The procedure will be described below.

A target position to be given to a control object is given by an ideal position profile 6001. In this embodiment, the target position corresponds to an absolute position at which a paper sheet conveyed by the line feed motor should arrive at a given time. This position information changes as the time elapses. When tracking control is executed for the ideal position profile, drive control of this embodiment is done.

The apparatus has an encoder sensor 6005 to detect the physical rotation of the motor. An encoder position information conversion means 6009 obtains absolute position information by cumulatively adding the number of slits detected by the encoder sensor. An encoder speed information conversion means 6006 calculates the current driving speed of the line feed motor from the signal from the encoder sensor 6005 and a clock (timer) incorporated in the printer.

A numerical value obtained by subtracting the actual physical position obtained by the position information conversion means 6009 from the ideal position profile 6001 is transferred to feedback processing of position servo from a circuit 6002. The circuit 6002 is the major loop of position servo. Generally, a means for executing calculation related to a proportional term P is known.

As an arithmetic result of the circuit 6002, a speed command value is output. This speed command value is transferred to feedback processing of speed servo from a circuit 6003. As the minor loop of speed servo, a means for executing PID arithmetic operation for the proportional term P, integral term I, and derivative term D is generally used.

In this embodiment, to improve the followability when the speed command value has nonlinearly changed and also to prevent any influence of derivative operation in tracking control, a method generally called D-PI is shown. The encoder speed information obtained by the encoder speed information conversion means 6006 is passed through a derivative operation circuit 6007 before calculating the difference between it and the speed command value obtained by the circuit 6002. This method itself is irrelevant to the present invention. Derivative operation by the circuit 6003 sometimes suffices depending on the characteristics of the system to be controlled.

In the minor loop of speed servo, a numerical value obtained by subtracting encoder speed information from the speed command value is transferred to the PI arithmetic circuit 6003 as a speed error that is short of the target speed. An energy to be applied to the DC motor at that time is calculated by a method called PI arithmetic operation. Upon receiving the energy, the motor driver circuit changes the duty of the applied voltage using, e.g., a means (to be referred to as "PWM (Pulse Width Modulation) control" hereinafter) for changing the pulse width of the applied voltage while keeping the motor applied voltage unchanged. With this operation, the current value is adjusted, and the energy to be applied to a DC motor 6004 is adjusted, thereby controlling the speed.

The DC motor which rotates upon receiving the current value physically rotates while being influenced by the disturbance of a DC motor 6008. The output of the DC motor is detected by the encoder sensor 6005.

Figure 7:
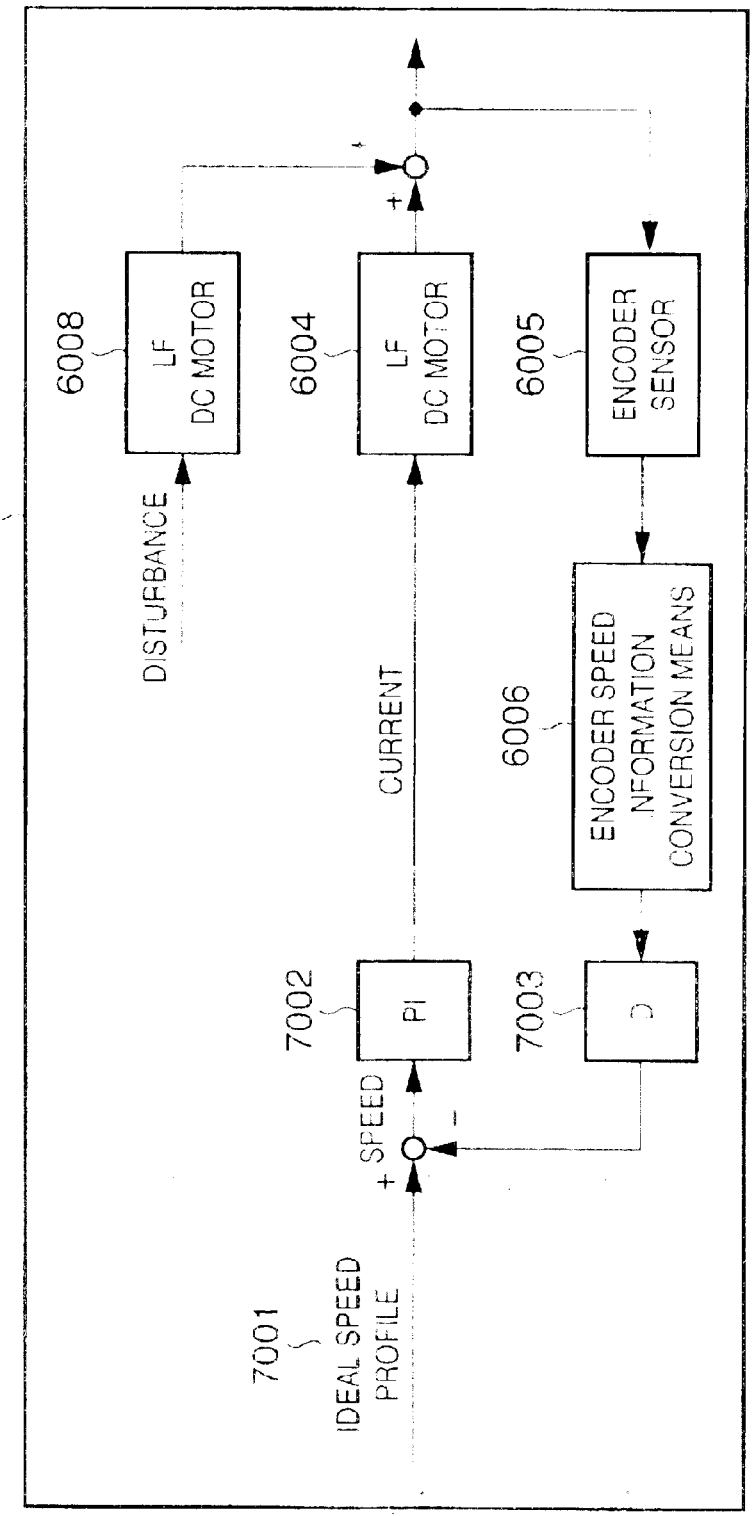
FIG. 7 is a block diagram showing a control procedure by speed servo of a general DC motor.

FIG. 7 is a block diagram for explaining a control procedure (7000) in speed servo of the general DC motor. In this embodiment, speed servo is used in the positioning control region. The DC motor is controlled by a method called PID control or classic control. The procedure will be described below.

A target speed to be given to a control object is given by an ideal speed profile 7001. In this embodiment, the target speed corresponds to an ideal speed at which a paper sheet should be conveyed by the line feed motor at a given time. The target speed corresponds to a speed command value at the given time. This speed information changes as the time elapses. When tracking control is executed for the ideal speed profile, drive control of this embodiment is done.

In speed servo, a means for executing PID arithmetic operation for the proportional term P, integral term I, and derivative term D is generally used. In this embodiment, to improve the followability when the speed command value has nonlinearly changed and also to prevent any influence of derivative operation in tracking control, a method generally called D-PI is shown. The encoder speed information obtained by the encoder speed information conversion means 6006 is passed through a derivative operation means 7003 before calculating the difference between it and the speed command value obtained by the circuit 7001. This method itself is irrelevant to the present invention. Derivative operation by a circuit 7002 sometimes suffices depending on the characteristics of the system to be controlled.

In speed servo, a numerical value obtained by subtracting encoder speed information from the speed command value is transferred to the PI arithmetic circuit 7002 as a speed error that is short of the target speed. An energy to be applied to the DC motor at that time is calculated by a method called PI arithmetic operation. Upon receiving the energy, the motor driver circuit changes the duty of the applied voltage using, e.g., PWM control. With this operation, the current value is adjusted, and the energy to be applied to the DC motor 6004 is adjusted, thereby controlling the speed.

The DC motor which rotates upon receiving the current value physically rotates while being influenced by the disturbance of the DC motor 6008. The output of the DC motor is detected by the encoder sensor 6005.

Figure 1:
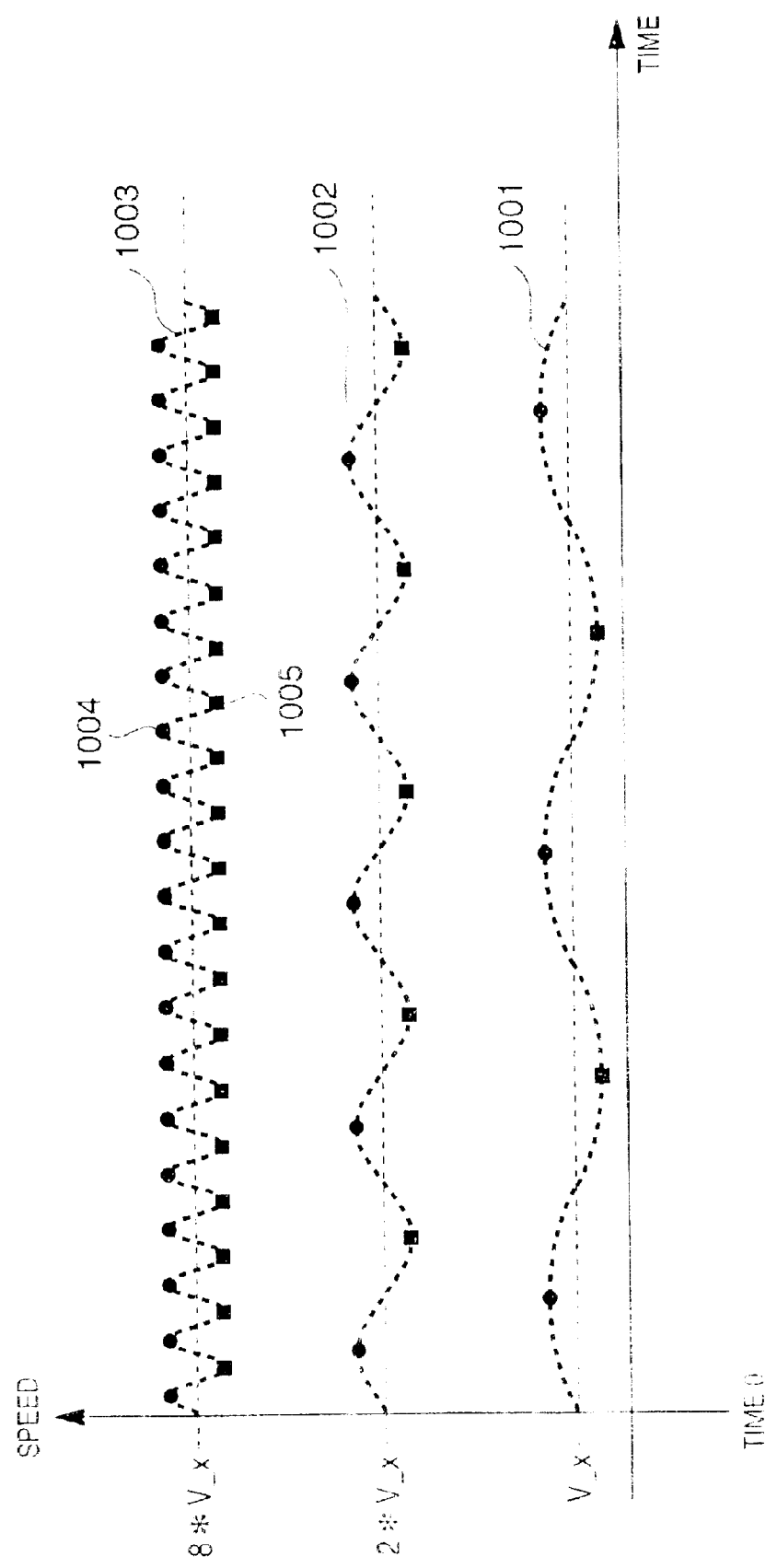
FIG. 1 is a graph simply showing a speed variation when a DC motor is driven at a constant speed.
Figure 2:
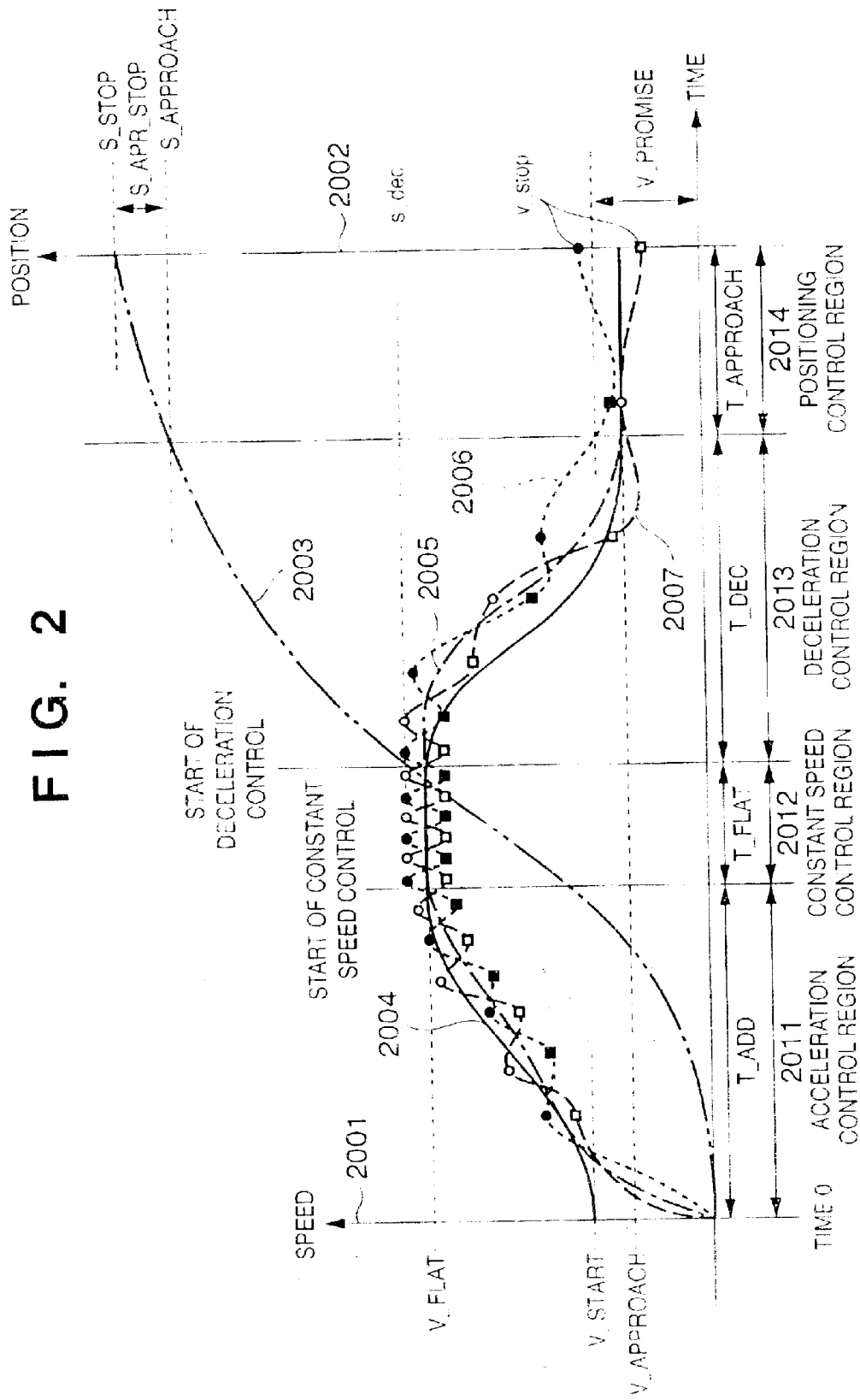
FIG. 2 is a timing chart for explaining the influence of a torque variation due to cogging by exemplifying ideal position profile tracking control and ideal speed profile tracking control used for a DC motor.
Figure 8:
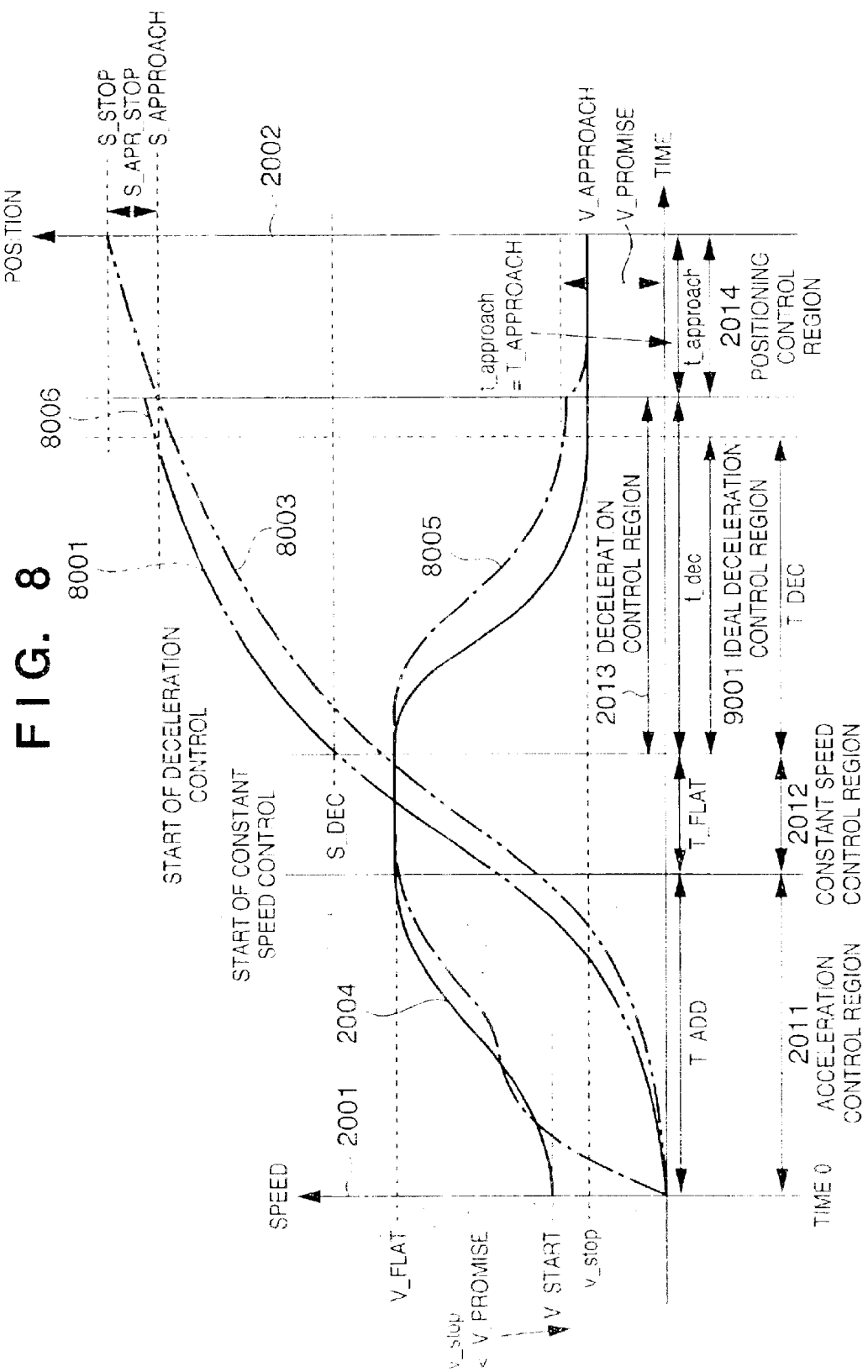
FIGS. 8 to 10 are timing charts for explaining the influence of a torque variation due to cogging and control in detail.
Figure 9:
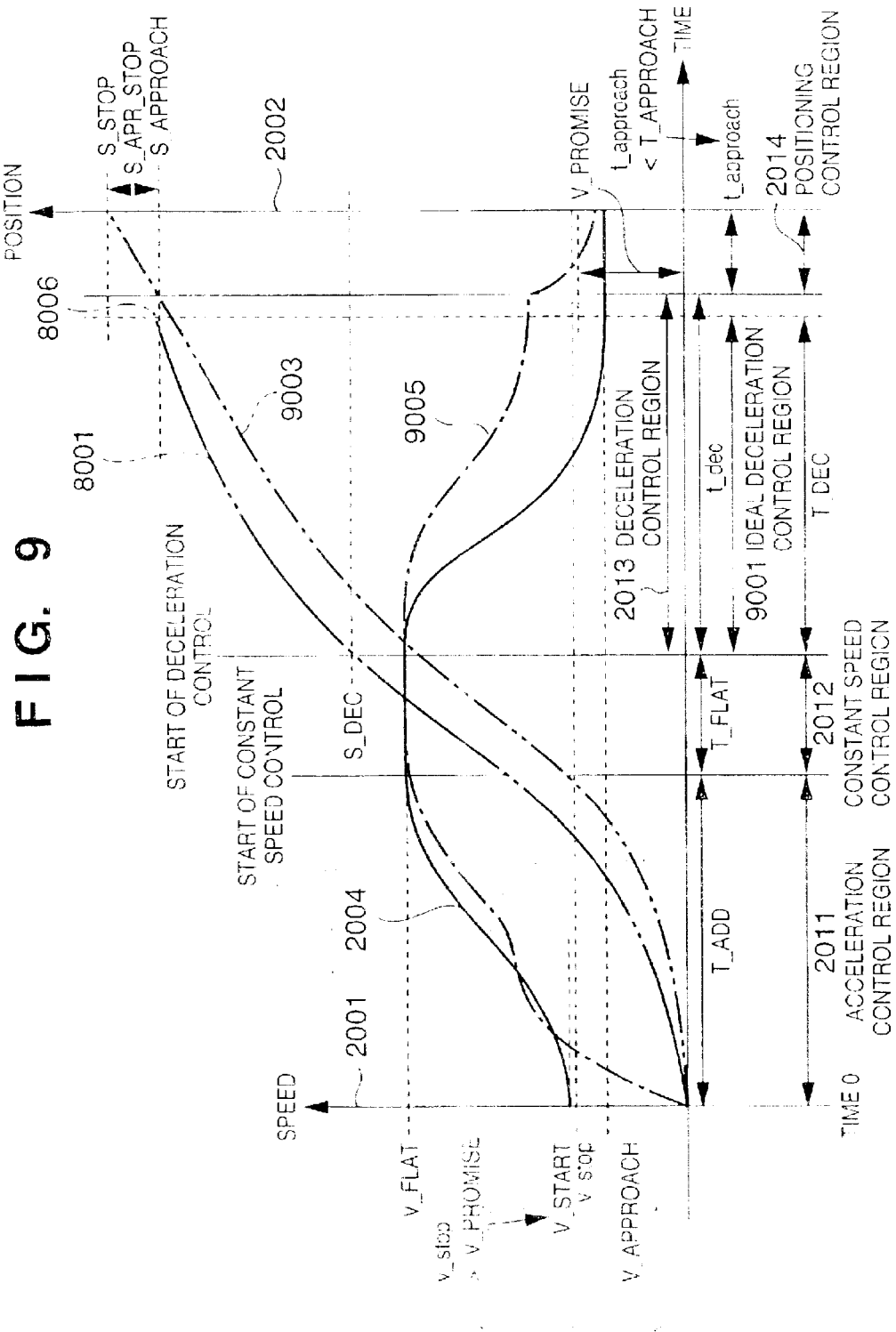
Figure 10:
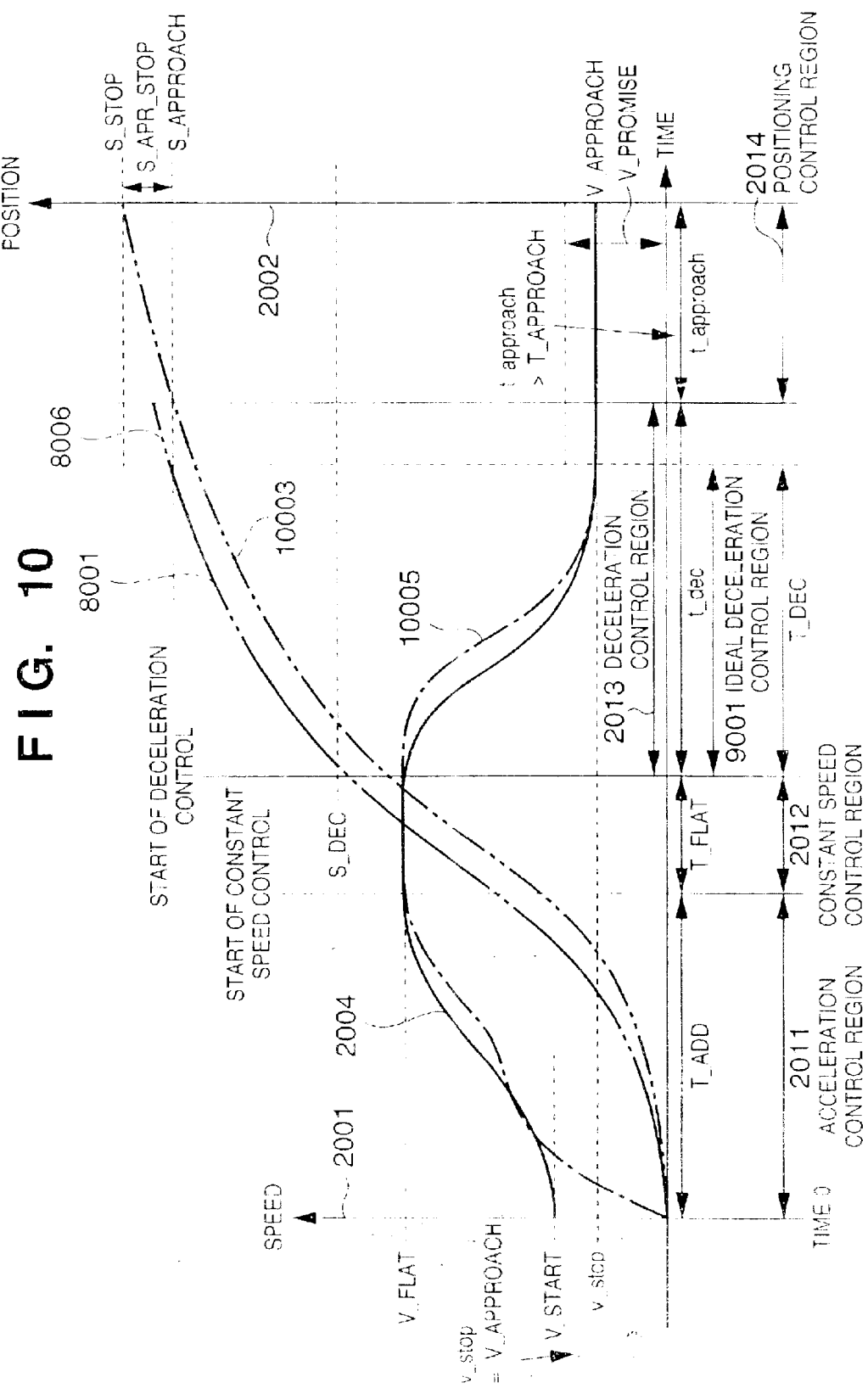

FIGS. 8, 9, and 10 are timing charts for explaining the influence of a torque variation due to cogging and control, which are described in FIG. 2, in more detail.

FIG. 8 shows a case wherein a speed v_stop immediately before stop ends at an average and ideal value V_APPROACH. FIG. 9 shows a case wherein t_approach<T_APPROACH, i.e., the speed v_stop immediately before stop ends before the expected time. FIG. 10 shows a case wherein t_approach>T_APPROACH, i.e., the speed v_stop immediately before stop ends after the expected time.

The ideal position profile 8001 is set in the regions 2011, 2012, and 2013 for position servo, though it is calculated only until S_APPROACH. This is because the ideal position profile is unnecessary from S_APPROACH because control is switched to speed servo from S_APPROACH. A time T_DEC required for deceleration in the ideal position profile 8001 is constant independently of actual driving. A control region corresponding to the time T_DEC is indicated by an ideal deceleration control region 9001.

Reference numerals 8003, 9003, and 10003 denote actual position profiles in the situations of disturbance influence. In this case, in order to clarify the subject of explanation, actual position profiles of the physical motor with averaging variations in high frequencies due to cogging are shown.

In position servo, since a delay always occurs, the actual position profiles 8003, 9003, and 10003 have delays with respect to the ideal position profile 8001. Hence, even when the ideal position profile 8001 is ended, the actual position does not reach S_APPROACH in general. In this embodiment, a virtual ideal position profile 8006 is used as the commanded position value to position servo after the ideal position profile 8001 is ended until actual driving reaches S_APPROACH. The virtual ideal position profile 8006 is indicated by a straight line extended from the end of the ideal position profile using the final gradient of the ideal position profile 8001.

Reference numerals 8005, 9005, and 10005 represent actual driving speed profiles of the physical motor as does reference numeral 2005. In this case, in order to clarify the subject of explanation, actual driving speed profiles of the physical motor with averaging variations in high frequencies due to cogging are shown in a simplified manner, and the influences of disturbance are taken into account in the profiles.

The same reference numerals as in FIG. 2 denote the same parts in FIGS. 8, 9, and 10. In FIG. 2, an ideal value T_APPROACH of a time required for a positioning control region 2014 is a constant value. In FIGS. 8, 9, and 10, an actual variable value t_approach of a time required for the positioning control region 2014 is added as an actual value that changes to any value due to disturbance when actual driving is assumed.

In this embodiment, a constant value is indicated by upper-case letters, and a variable value is indicated by lower-case letters. When values with the same spelling are represented by both upper- and lower-case letters, the value indicated by upper-case letters represents an ideal constant value, and the value indicated by lower-case letters represents a variable value that can change for the value with the same content.

S_DEC represents a position at which the constant speed control region 2012 is ended and the deceleration control region 2013 starts. Since S_DEC is a value determined by the ideal position profile 8001, it has nothing to do with the influence of disturbance in actual driving.

As described above, referring to FIG. 8, a speed v_stop immediately before stop ends as an average and ideal value V_APPROACH. Since v_stop<V_PROMISE and t_approach=T_APPROACH, both the speed immediately before stop and required driving time satisfy conditions.

Referring to FIG. 9, since v_stop>V_APPROACH, i.e., the speed is too high, the condition of the speed immediately before stop cannot be satisfied. Such driving actually occurs mainly because the speed at the moment when the position has reached S_APPROACH is too high due to the influence of a torque variation caused by cogging in the deceleration region. Even when a position S_STOP has a phase angle corresponding to a point 1004 at which the speed increases due to the torque variation of the motor, the same result as described above may be obtained.

On the other hand, referring to FIG. 10, since t_approach>T_APPROACH, i.e., the time is too long, the condition of the required driving time cannot be satisfied. Such driving actually occurs mainly because the speed decreases a long time before the position reaches S_APPROACH due to the influence of a torque variation caused by cogging in the deceleration region. Even when the position S_STOP has a phase angle corresponding to a point 1005 at which the motor speed decreases, the same result as described above may be obtained.

Figure 11:
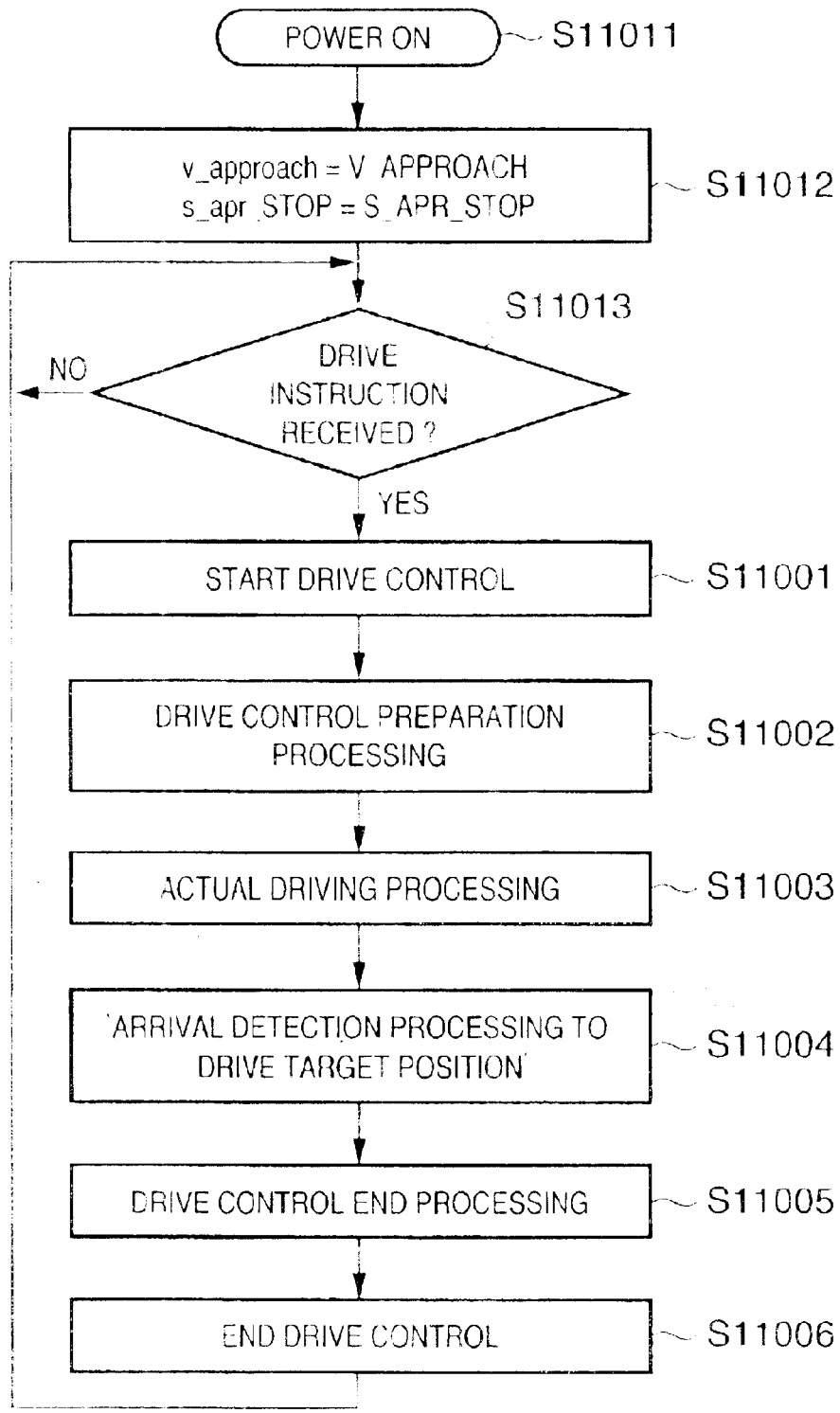
FIG. 11 is a flowchart for explaining drive control processing in the first embodiment.
Figure 12:
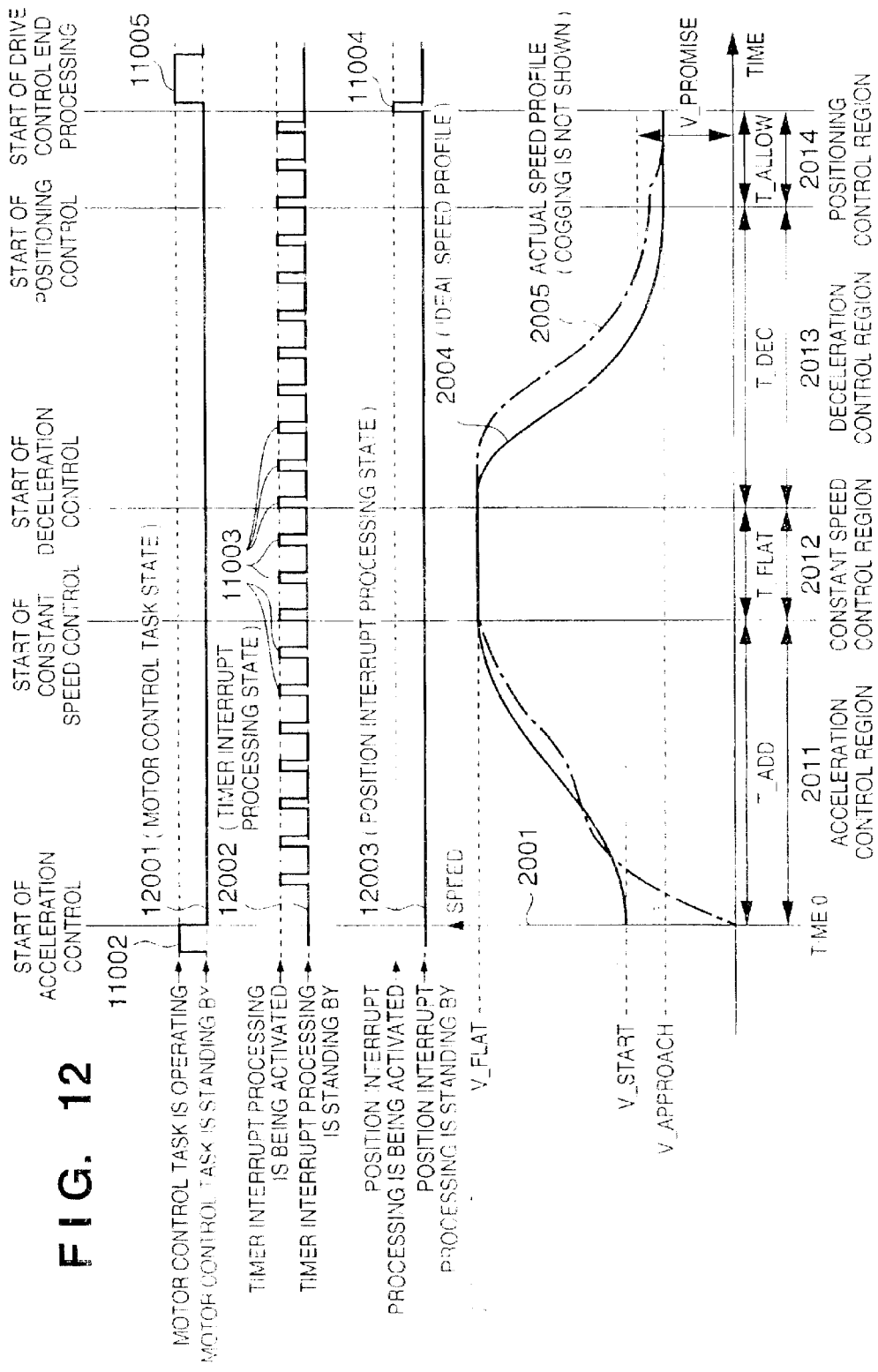
FIG. 12 is a timing chart showing the states of signals related to processing operations shown in FIG. 11 together with the speed profiles on a single time axis.

FIG. 11 is a flowchart for explaining drive control processing in this embodiment. FIG. 12 is a timing chart showing the states of signals related to processing operations shown in FIG. 11 together with the speed profiles on a single time axis.

When the apparatus is powered on in step S11011, the flow advances to step S11012 to set V_APPROACH to v_approach and S_APR_STOP to s_apr_STOP as default values.

The flow advances to step S11013 to wait until a drive instruction is issued by the printer system. If a drive instruction is received, the flow advances to step S11001.

When drive control processing starts in step S11001, drive control preparation is done in step S11002. Preparation processing in step S11002 is generally described in the motor control task. In this processing, a table appropriate to the drive purpose is selected, T_FLAT that matches the drive amount is set, and a reflection means which reflects a result of an evaluation means on the ideal speed profile to be used for the next driving as the gist of the present invention and various work regions are set. Finally, a timer which controls timer interrupt processing is activated, and the preparation is ended.

When the timer is activated in step S11002, the flow advances to actual driving processing (S11003). Step S11003 is processing that is generally described in timer interrupt processing. For example, an interrupt is executed every msec to read the value of the encoder, calculate by PID arithmetic operation or the like the current value to be output, and output the value to the motor.

In parallel to the processing in step S11003, it is monitored in the system whether the position has arrived at the stop position S_STOP. When the arrival is detected, an arrival detection means 11004 to the drive target position operates to generate an interrupt. The processing advances to a drive control end means 11005.

In step S11005, after the output to the motor is quickly disabled, the timer is stopped. An evaluation means as the gist of the present invention is executed, and the processing is ended.

With the above processing operations, one driving processing cycle reaches drive control end in step S11006.

Figure 13:
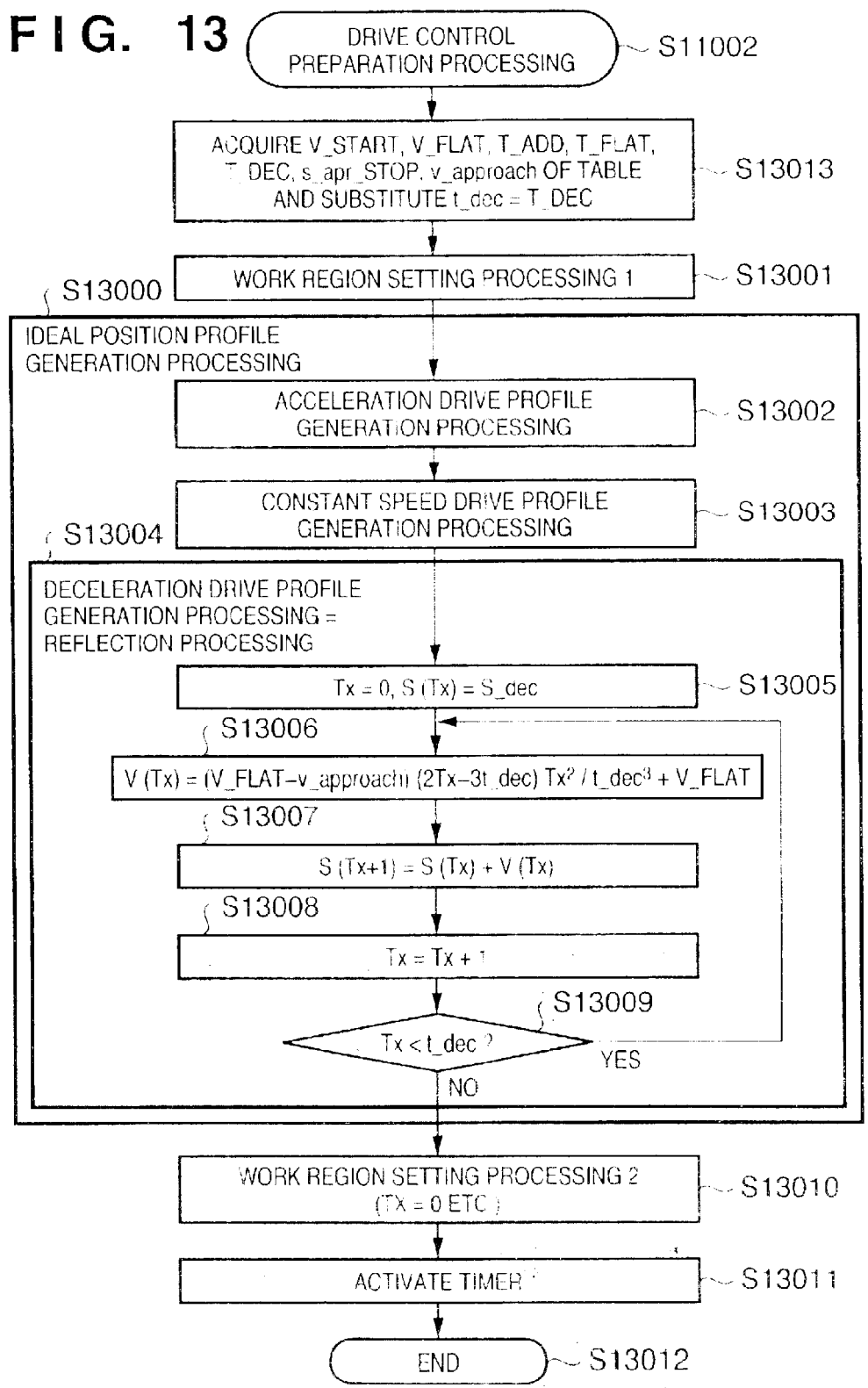
FIG. 13 is a flowchart showing operation executed in drive control preparation processing in FIG. 11.

FIG. 13 is a flowchart showing an operation executed in the drive control preparation processing in step S11002 in detail.

In the drive control preparation processing, a table appropriate to the drive purpose and drive amount is selected, and v_approach, V_FLAT, T_DEC, s_apr_STOP, V_START, T_ADD, and T_FLAT in the table are acquired. A serial printer apparatus generally has a plurality of types of tables for a line feed motor for the purpose of an increase in processing speed, noise reduction, and synchronous control with a feed motor. A table to be used here is selected. A case wherein T_DEC is stored in a variable region t_dec, and S_DEC is stored in a variable region s_dec will be described here.

In step S13001, feedback control gain setting suitable for the table is done. Since this processing is the same as in the prior art and is irrelevant to this embodiment, a description thereof will be omitted.

Step S13000 indicates ideal position profile generation processing. This processing is executed to generate an ideal position profile 8001 and will be described below in detail.

In step S13002, an acceleration drive profile is generated. This processing is the same as in the prior art. As the acceleration drive profile, for example, a position profile is generally obtained by using a linear function or cubic function having time as an input and speed as an output and adding the outputs.

In step S13003, a constant speed drive profile is generated. This processing is also the same as in the prior art. As the constant speed drive profile, for example, a change in position in driving by V_FLAT is generally calculated.

In step S13004, a deceleration drive profile is generated. This is characteristic processing of this embodiment and will be described below in detail.

In step S13005, a time value Tx is initialized, and s_dec as a deceleration start position is set as the initial value of an ideal position S(Tx) at which the position should arrive at the time Tx.

In step S13006, an ideal speed V(Tx) at the time Tx is calculated by the cubic deceleration curve of speed. In this embodiment, the cubic deceleration curve of speed can be obtained by $$V(Tx) = (V\_FLAT - v\_approach)(2Tx - 3t\_dec)Tx^2/t\_dec^3 + V\_FLAT$$

As is apparent from this equation, this structure is characterized in that the curve can be flexibly changed following up a change in v_approach. The deceleration curve used in the present invention is not limited to this. A linear deceleration curve or a curve represented by any other function may be used in accordance with the characteristic of the system. Any deceleration curve that can reflect a change in v_approach can have the effect intended by the present invention.

In step S13007, V(Tx) can be added to S(Tx) to calculate the ideal position S(Tx+1) at which the position should arrive at time Tx+1.

In step S13008, Tx is incremented. Processing in steps S13006 to S13008 is repeated to calculate V(Tx) and S(Tx) at each Tx until the value of the counter Tx equals the value t_dec that means the end of an ideal deceleration control region 9001 in step S13009.

When the above processing is ended, the flow advances to step S13010 to execute various setting operations, i.e., to initialize the time counter Tx added by profile calculation again so as to prepare for actual control and to activate the timer. This processing is the same as in the prior art, and a description thereof will be omitted.

When the timer is activated in step S13011, the drive control preparation processing is ended in step S13012.

Figure 14:
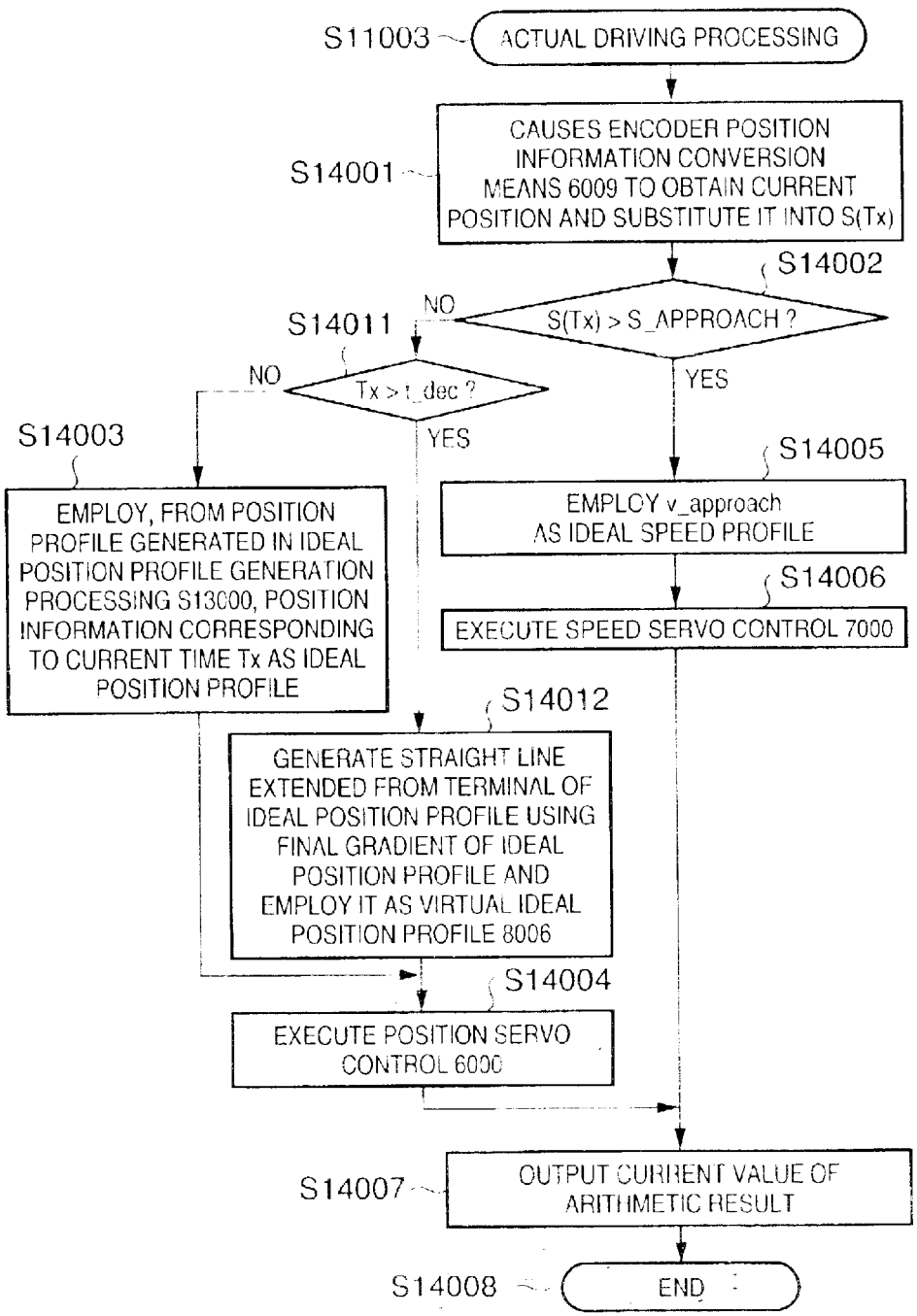
FIG. 14 is a flowchart showing operation executed in actual drive processing in FIG. 11.

FIG. 14 is a flowchart showing an operation executed in actual drive processing in step S11003. FIG. 14 shows processing that is executed every time a timer interrupt occurs.

When a timer interrupt takes place, and step S11003 is activated, the flow advances to Step 14001 to cause an encoder position information conversion means 6009 to obtain the current position and substitute it into S(Tx).

In step S14002, it is determined whether the position has reached the positioning control region 2014. If NO in step S14002, the flow advances to step S14011. If YES in step S14002, the flow advances to step S14005.

In step S14011, it is determined whether the position is in the ideal deceleration control region 9001. If YES in step S14011, the flow advances to step S14003. If NO in step S14011, the flow advances to step S14012.

In step S14003, from the position profile generated in the ideal position profile generation processing in step S13000, position information corresponding to the current time Tx is employed as an ideal position profile. Then, the flow advances to step S14004.

On the other hand, in step S14012, since the position falls outside the region generated in the ideal position profile generation processing in step S13000, a straight line extended from the terminal of the ideal position profile is generated using the final gradient of the ideal position profile and employed as a virtual ideal position profile. Then, the flow advances to step S14004.

In step S14004, position servo control 6000 shown in FIG. 6 is executed using the position command value obtained by the above processes. Then, the flow advances to step S14007.

In step S14005, v_approach is employed as the ideal speed profile, and speed servo control 7000 shown in FIG. 7 is executed using that value as a speed command value. Then, the flow advances to step S14007.

In step S14007, the current value as the arithmetic result is output to the motor. In step S14008, the processing in the interrupt is ended.

Figure 15:
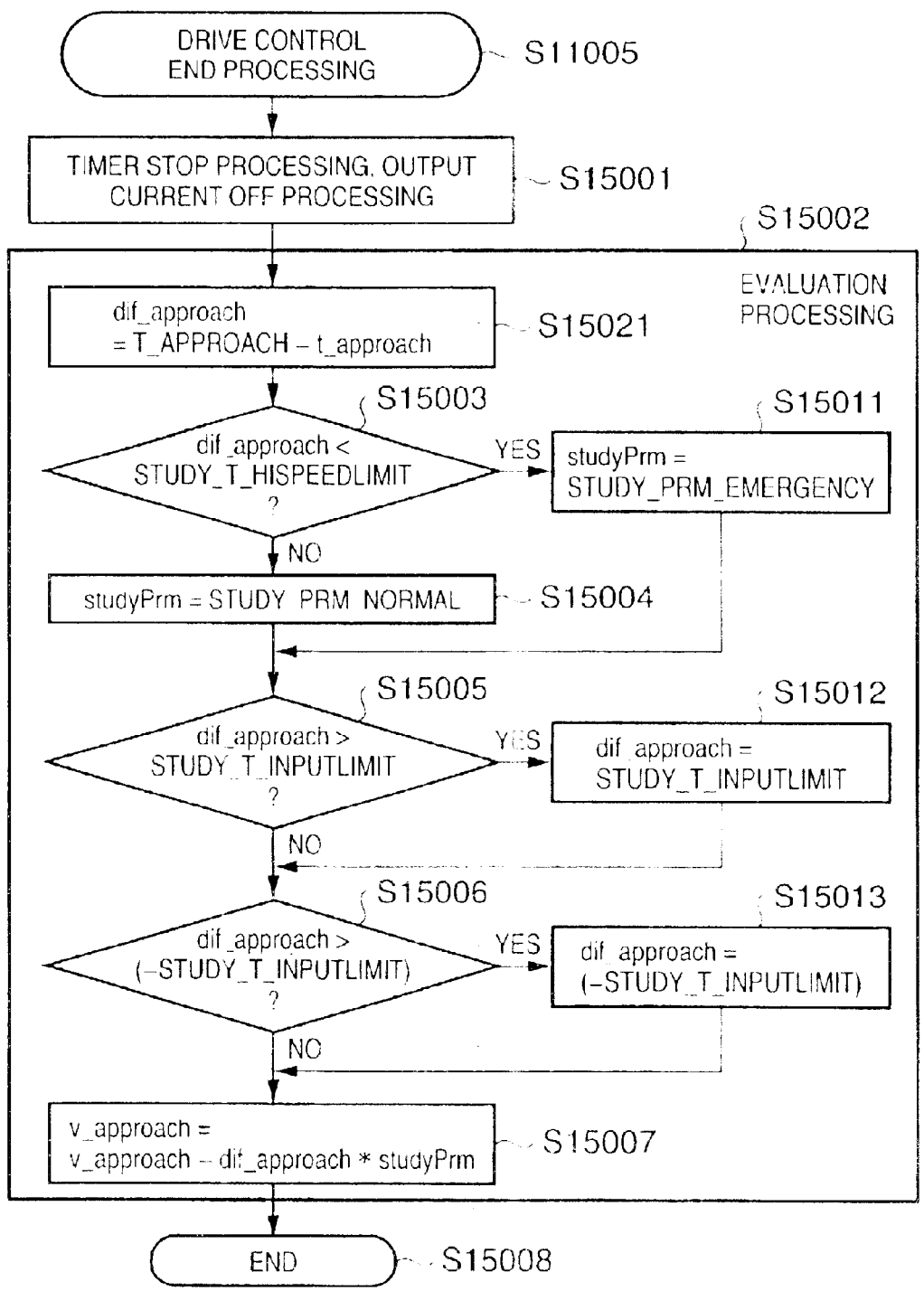
FIG. 15 is a flowchart showing operation executed in drive control end processing in FIG. 11.

FIG. 15 is a flowchart for explaining an operation executed in drive control end processing in step S11005.

In step S15001, the output current is disabled, and the timer is stopped. The flow advances to evaluation processing in step S15002. This evaluation processing is characteristic processing of this embodiment and will be described below in detail.

In step S15021, the difference between the ideal value T_APPROACH and the actually required time t_approach is calculated and substituted into dif_approach. Then, the flow advances to step S15003.

An improvement coefficient studyPrm reflects the degree of deviation of t_approach from the ideal value on v_approach in the next driving cycle.

In step S15003, dif_approach is compared with STUDY_T_HISPEEDLIMIT. If dif_approach is too small, the flow advances to step S15011 to employ STUDY_PRM_EMERGENCY as studyPrm. If dif_approach is not too small, the flow advances to step S15004 to employ STUDY_PRM_NORMAL. Here, STUDY_PRM_EMERGENCY>STUDY_PRM_NORMAL.

This processing assumes a case wherein since the time t_approach is too short, the position reaches S_STOP without sufficient deceleration, and the speed v_stop becomes too high. In this case, when STUDY_PRM_EMERGENCY is employed in step S15011, the speed v_approach finally output in the evaluation processing in step S15002 is made lower by calculation in step S15007 (to be described later). That is, the time t_approach in the next driving cycle is expected to be more abruptly prolonged as compared to a case wherein v_approach calculated using STUDY_PRM_NORMAL is used. Hence, the problem that the stop position accuracy is not guaranteed because the speed v_stop is too high can be solved.

Assume that STUDY_PRM_EMERGENCY is always employed as studyPrm. In this case, when the time t_approach is long, it is more abruptly shortened, and the speed v_stop in the next driving cycle becomes high. However, when this state is detected by determination in step S15003, the flow branches to step S15004. Hence, in this case, STUDY_PRM_NORMAL is employed.

In steps S15005 and S15006, the absolute value of dif_approach is compared with STUDY_T_INPUTLIMIT. If the absolute value of dif_approach is larger, this value is changed to ±STUDY_T_INPUTLIMIT as the maximum limit value in step S15012 or S15013. This processing is done to suppress the influence of unexpected maximum disturbance.

As described above, steps S15003, S15011, S15004, S15005, S15006, S15012, and S15013 realize a very effective function in calculating v_approach in this embodiment.

The present invention has as its object to improve both the case wherein since v_stop>V_APPROACH, i.e., the speed is too high, the condition of the speed immediately before stop cannot be satisfied, as described in FIG. 9, and the case wherein since t_approach>T_APPROACH, i.e., the time is too long, the condition of the required driving time cannot be satisfied, as described in FIG. 10.

In positioning control of the line feed motor, the stop position accuracy must be guaranteed under any circumstance. However, the required driving time only needs to be achieved on average. Even when the required driving time is not strictly satisfied, no problem is posed as long as it falls within an allowable range.

Hence, if the speed v_stop immediately before stop exceeds V_APPROACH, the speed must be immediately improved. However, if improvement of the required driving time may degrade v_stop, careful handling is necessary even if it weakens the improving effect. Processing in steps S15003, S15011, S15004, S15005, S15006, S15012, and S15013 take this point into consideration.

Processing in step S15007 is the most important processing in this embodiment and serves as the core of the evaluation processing.

That is, the difference dif_approach obtained by subtracting the value t_approach actually detected in the just ended driving cycle from the ideal value T_APPROACH is multiplied by the appropriate coefficient studyPrm, and the resultant value is subtracted from the current speed v_approach, thereby calculating v_approach to be used in the next driving cycle.

When the above processing is ended, the processing is ended in step S15008.

The function of processing in step S15007 will be described below in detail with reference to FIGS. 16, 17, 18, and 19.

Figure 16:
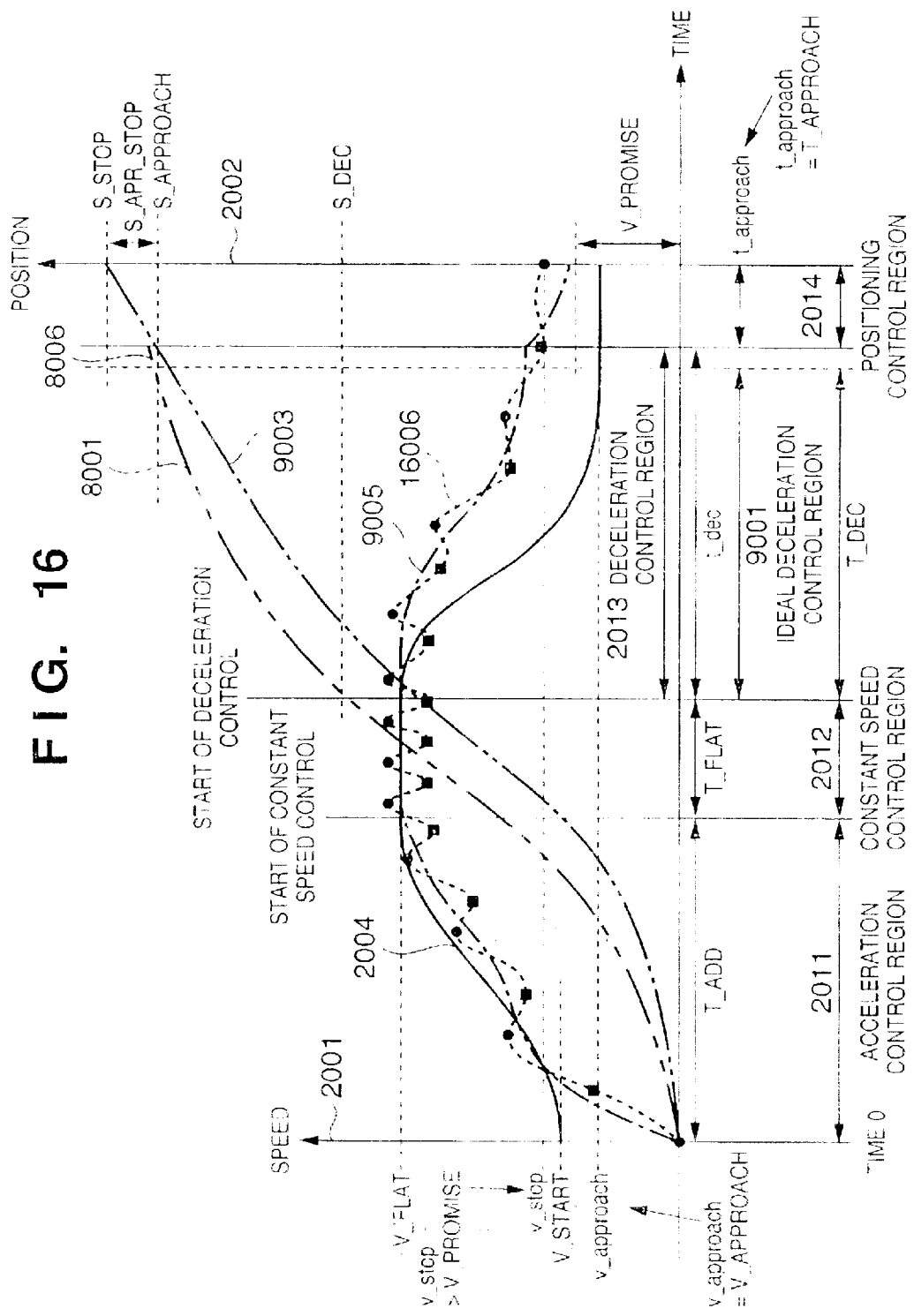
FIG. 16 is a graph obtained by adding to FIG. 9 the curve of the actual speed profile which specifically points out the torque variation due to cogging.
Figure 17:
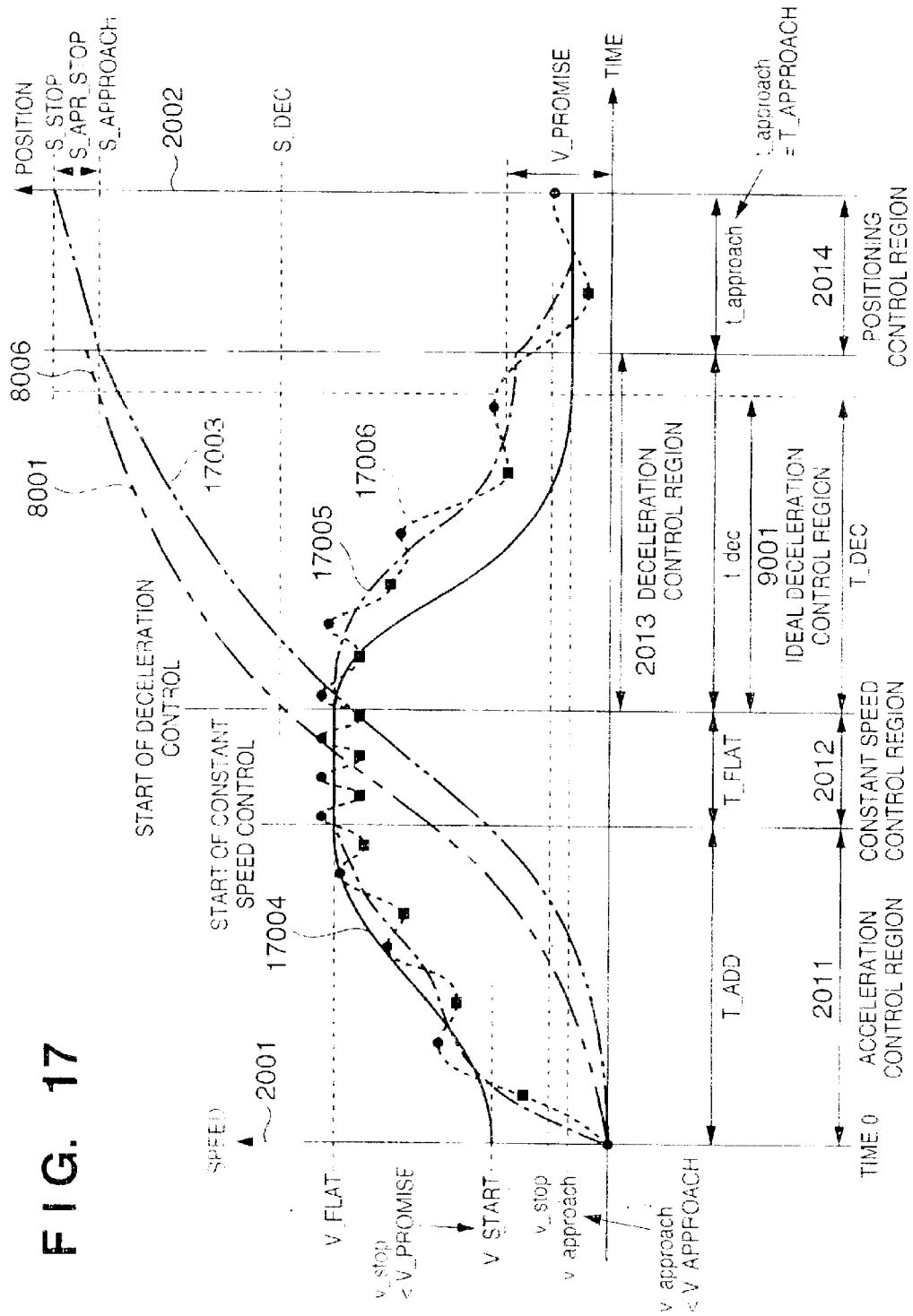
FIG. 17 is a graph showing a drive state after processing in step S15007 in FIG. 15.

FIG. 16 is a graph obtained by adding a curve 16006 of the actual speed profile which specifically points out the torque variation due to cogging to the graph shown in FIG. 9 which shows driving when the speed v_stop is too high. FIG. 17 is a graph showing a drive state after processing in step S15007.

As described above, this driving actually occurs mainly because the speed at the moment when the position has reached S_APPROACH is too high due to the influence of the torque variation caused by cogging in the deceleration region. Even when the position S_STOP has a phase angle corresponding to the point 1004 at which the speed increases due to the torque variation of the motor, the same result as described above may be obtained. FIG. 16 shows the two factors together to help understanding.

In this case, in order to improve the excessively short time t_approach, the processing in step S15007 acts to reduce the average speed in the positioning control region 2014 by decreasing the speed v_approach for the next driving cycle so as to increase the time t_approach and decrease the speed v_stop.

Figure 18:
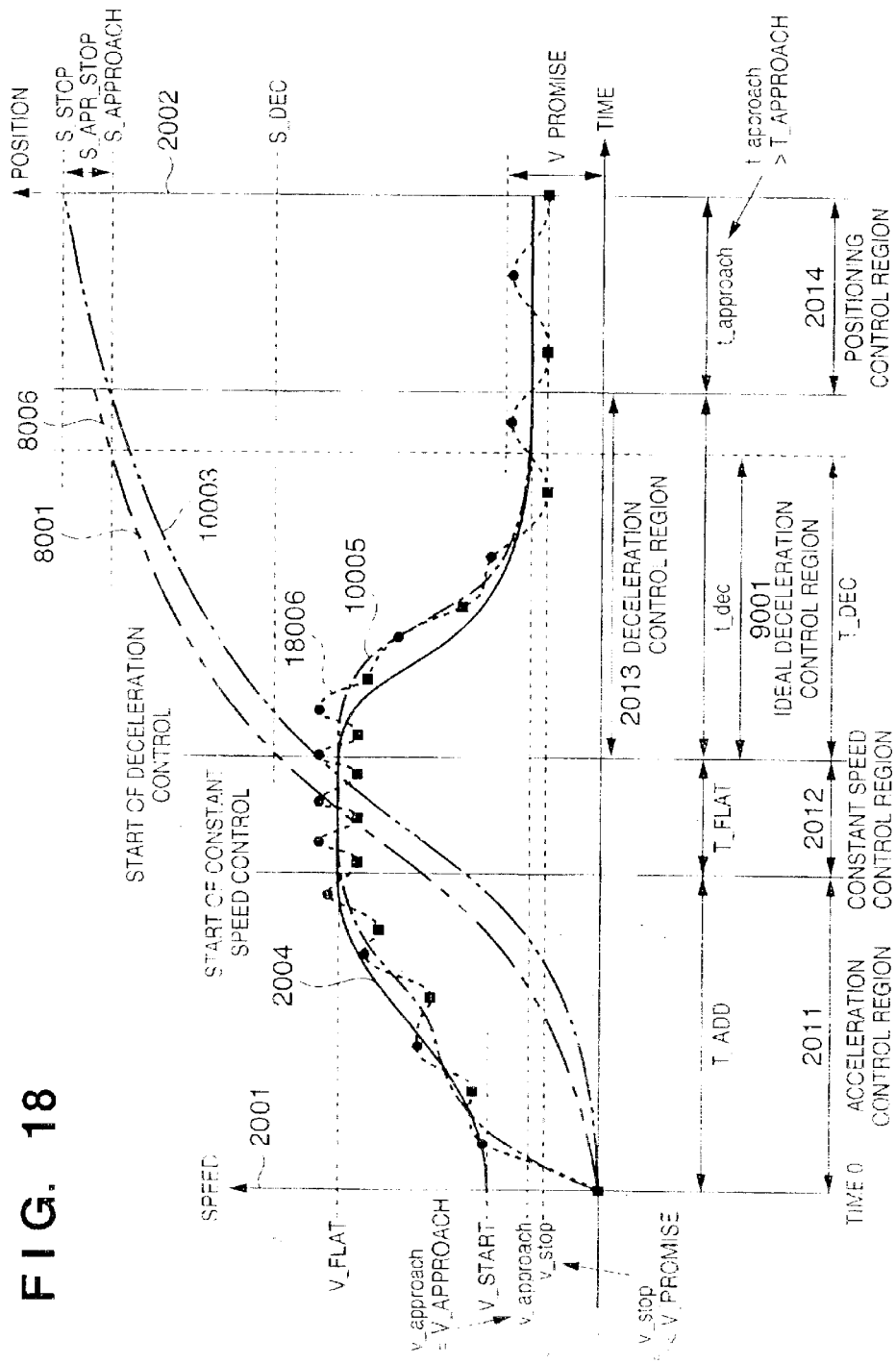
FIG. 18 is a graph obtained by adding to FIG. 10 the curve of the actual speed profile which specifically points out the torque variation due to cogging.
Figure 19:
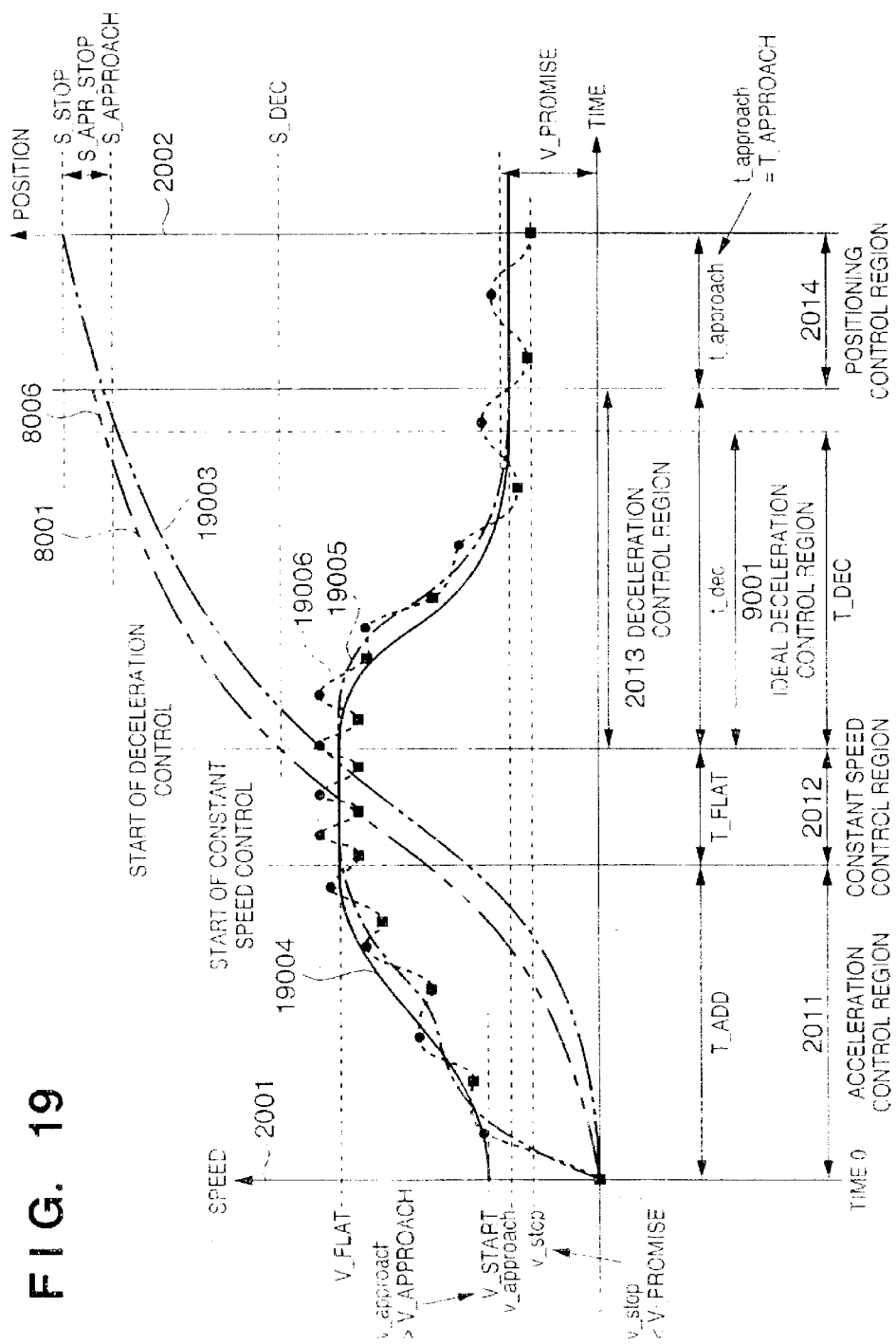
FIG. 19 is a graph showing a drive state after processing in step S15007 in FIG. 15.

FIG. 18 is a graph obtained by adding a curve 18006 of the actual speed profile which specifically points out the torque variation due to cogging to the graph shown in FIG. 10 which shows driving when the time t_approach is too long. FIG. 19 is a graph showing a drive state after processing in step S15007.

As described above, this driving actually occurs mainly because the speed decreases a long time before the position reaches S_APPROACH due to the influence of the torque variation caused by cogging in the deceleration region. Even when the position S_STOP has a phase angle corresponding to the point 1005 at which the motor speed decreases, the same result as described above may be obtained. FIG. 18 shows the two factors together to help understanding.

In this case, in order to improve the excessively long time t_approach, the processing in step S15007 acts to increase the average speed in the positioning control region 2014 by increasing the speed v_approach for the next driving cycle so as to decrease the time t_approach and increase the speed v_stop.

As described above, according to this embodiment, high-speed accurate positioning control of the line feed motor can be achieved. Hence, the performance of the apparatus can be improved.

A DC motor that is greatly influenced by the torque variation due to cogging has been described above as a main object to be controlled. However, the present invention is also effective even in a system that employs an ultrasonic motor that is not influenced by the cogging torque variation. Even in a system that employs a motor without any cogging torque variation, the difference in control result as shown in FIGS. 8, 9, and 10 is readily generated by an individual difference. The present invention can be used as a means for solving the individual difference.

[Second Embodiment]

The second embodiment of the present invention will be described below. In the second embodiment, the DC motor control method of the present invention is applied to control a line feed motor for printing medium conveyance in a serial inkjet printer, as in the first embodiment. Parts different from the first embodiment will be mainly described below.

In this embodiment, only drive control end processing executed in step S11005 is changed as compared to the first embodiment. The same reference numerals as in the first embodiment denote the same parts below, and a description thereof will be omitted.

Figure 20:
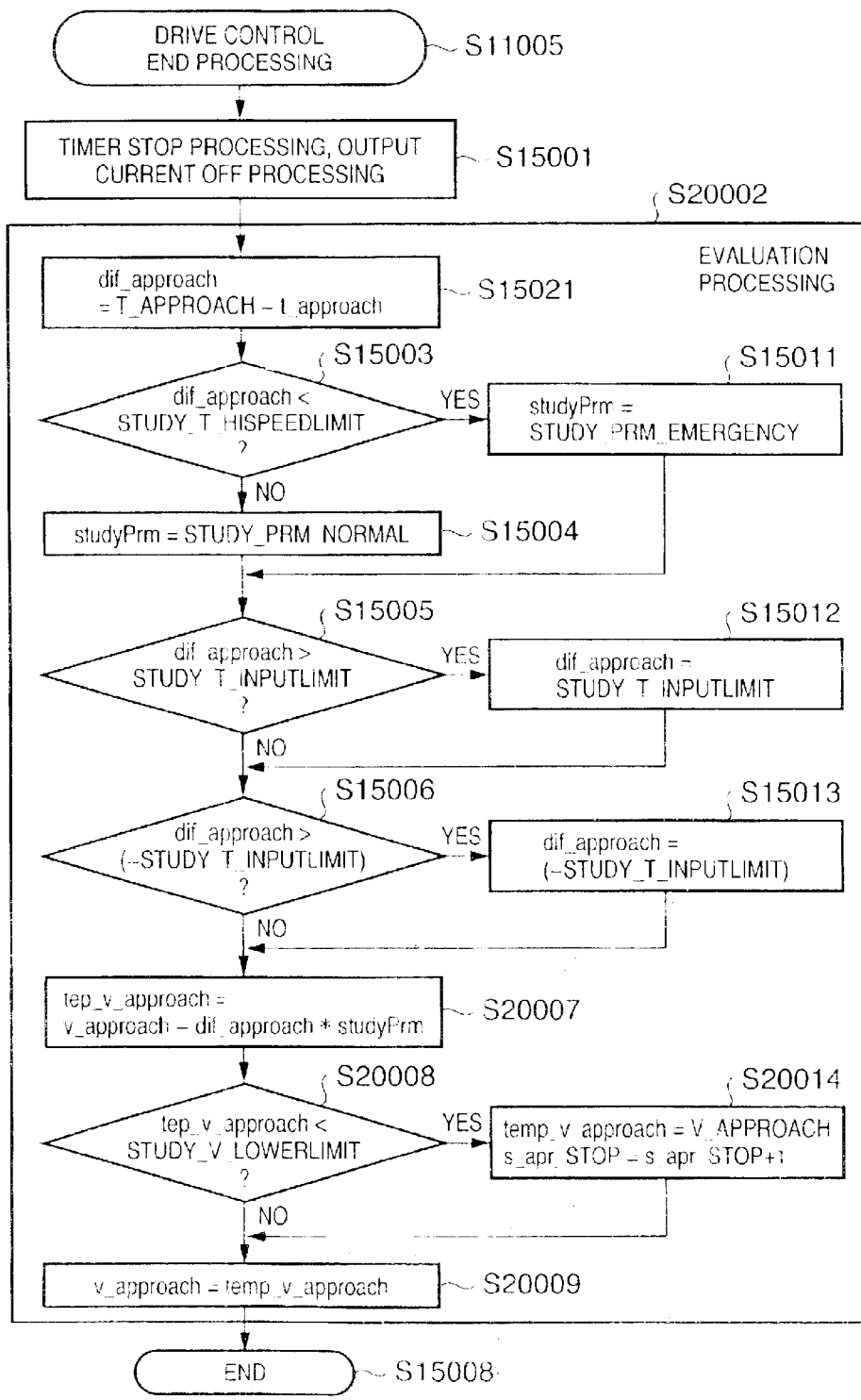
FIG. 20 is a flowchart showing drive control end processing of the second embodiment in detail.

FIG. 20 is a flowchart showing drive control end processing of this embodiment in detail. The contents of processing in steps S15001, S15021, S15003, S15011, S15004, S15005, S15012, S15006, and S15013 are the same as those described in the first embodiment with reference to FIG. 15, and a description thereof will be omitted.

Evaluation processing in step S20002 is characteristic processing of this embodiment and will be described below in detail.

In step S20007, a difference dif_approach obtained by subtracting a value t_approach actually detected in the just ended driving cycle from an ideal value T_APPROACH is multiplied by an appropriate coefficient studyPrm. The resultant value is subtracted from a current speed v_approach. A thus obtained value is stored in a work region temp_v_approach where a temporary value is stored.

In step S20008, the value temp_v_approach is compared with a preset lower limit value STUDY_V_LOWERLIMIT of v_approach. If the value temp_v_approach is smaller than the lower limit value, the flow advances to step S20014. Otherwise, the flow advances to step S20009.

In step S20014, the value temp_v_approach is returned to a default value V_APPROACH. Instead, a value s_apr_STOP is incremented. Then, the flow advances to step S20009.

In step S20009, the thus decided value temp_v_approach is substituted into v_approach.

When the above processing is ended, the processing is ended in step S15008.

The function of evaluation processing of this embodiment will be described below in detail with reference to FIGS. 21 and 22.

Figure 21:
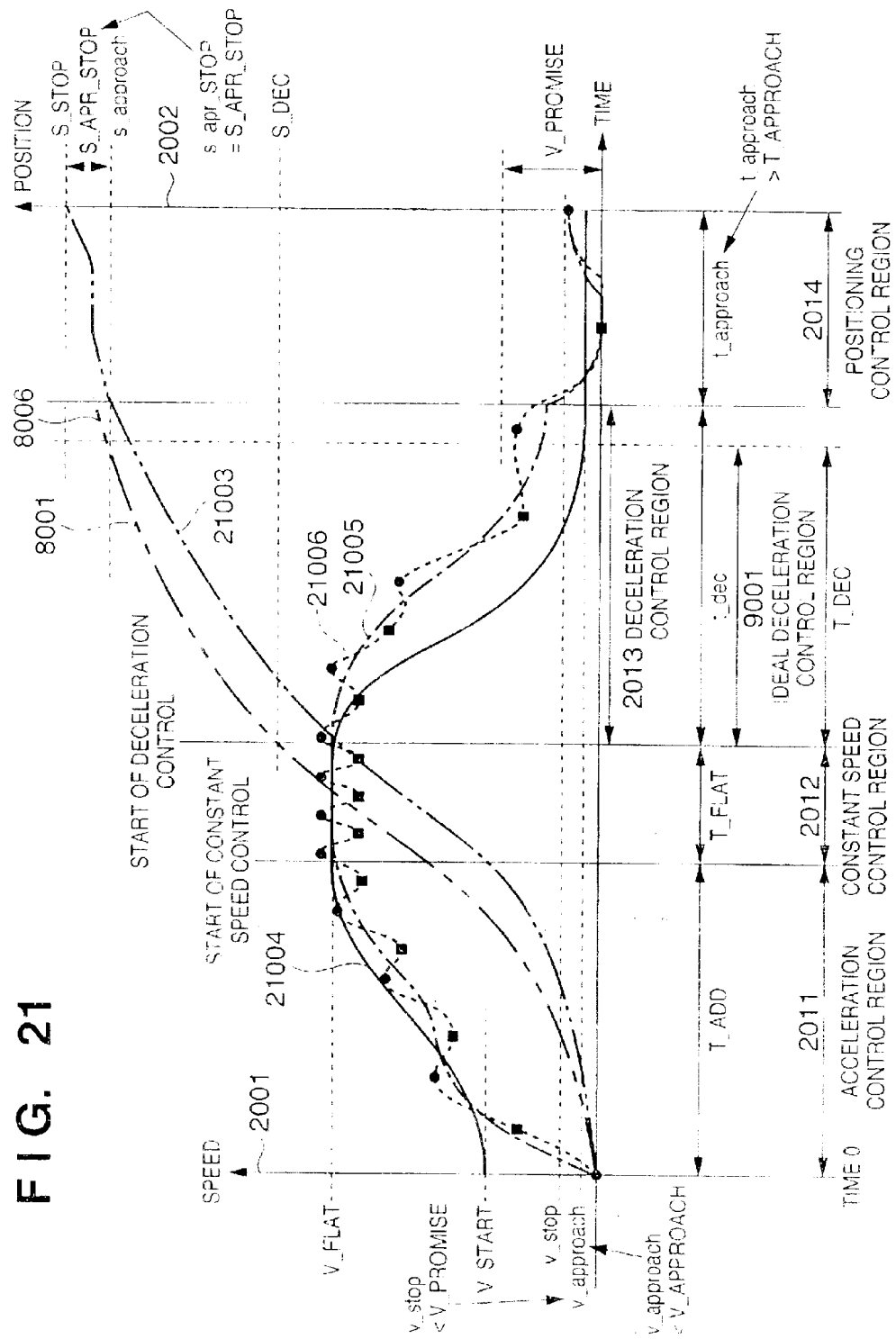
FIG. 21 is a graph showing a drive state when the speed in the positioning control region is decreased.

FIG. 21 is a graph showing a drive state when the speed v_approach is reduced by the processing described in the first embodiment to improve the excessively high speed v_stop. FIG. 22 is a graph showing a drive state after an improving effect by this embodiment is obtained.

In the processing described in the first embodiment, when the time t_approach is short, the value v_approach is endlessly decreased. When the value v_approach is excessively decreased, the motor may stop for an instant in a positioning control region 2014 before a position S_STOP, as shown in FIG. 21. In this case, the time t_approach is excessively prolonged.

The length of the stop time is not unique, i.e., it changes depending on the state of the line feed system at that time. Hence, the degree of improvement of t_approach is nonlinear. This does not satisfy the assumption in the first and second embodiments: to improve the control characteristic by reflecting a value obtained by multiplying dif_approach by studyPrm, the influence of the value on improvement of the control characteristic must be linear. Such a problem occurs because the value v_approach is excessively decreased, and the output unnecessary for achieving v_approach becomes smaller than the static frictional force in the system to be controlled. When such a nonlinear change occurs, it deviates from the allowable range to be coped with. Hence, control must be executed while satisfying the minimum speed at which the static frictional force poses no problem.

As described above, the phenomenon that the line feed motor stops in the positioning control region 2014 before the position reaches S_STOP must be avoided under any circumstance.

In this embodiment, to prevent this situation, processing in steps S20008 and S20014 is prepared. The effect of this processing will be described with reference to FIG. 22.

In this embodiment, the length required for the positioning control region 2014 is variable. This variable is defined as s_apr_STOP. The default value of s_apr_STOP after power-on is S_APR_STOP.

When the length of the positioning control region 2014 can be changed, and S_STOP should be kept unchanged, the position at which positioning control starts and the position at which deceleration control starts are variable. The former is defined as s_approach, and the latter is defined s_dec. The default value of s_approach after power-on is S_APPROACH, and the default value of s_dec after power-on is S_DEC.

When the length of the positioning control region 2014 can be changed, and the total drive amount should be kept unchanged, the length of a constant speed control region 2012 is also variable. A variable time value required for the constant speed control region 2012 is defined as t_flat. The default value of t_flat after power-on is T_FLAT.

Figure 22:
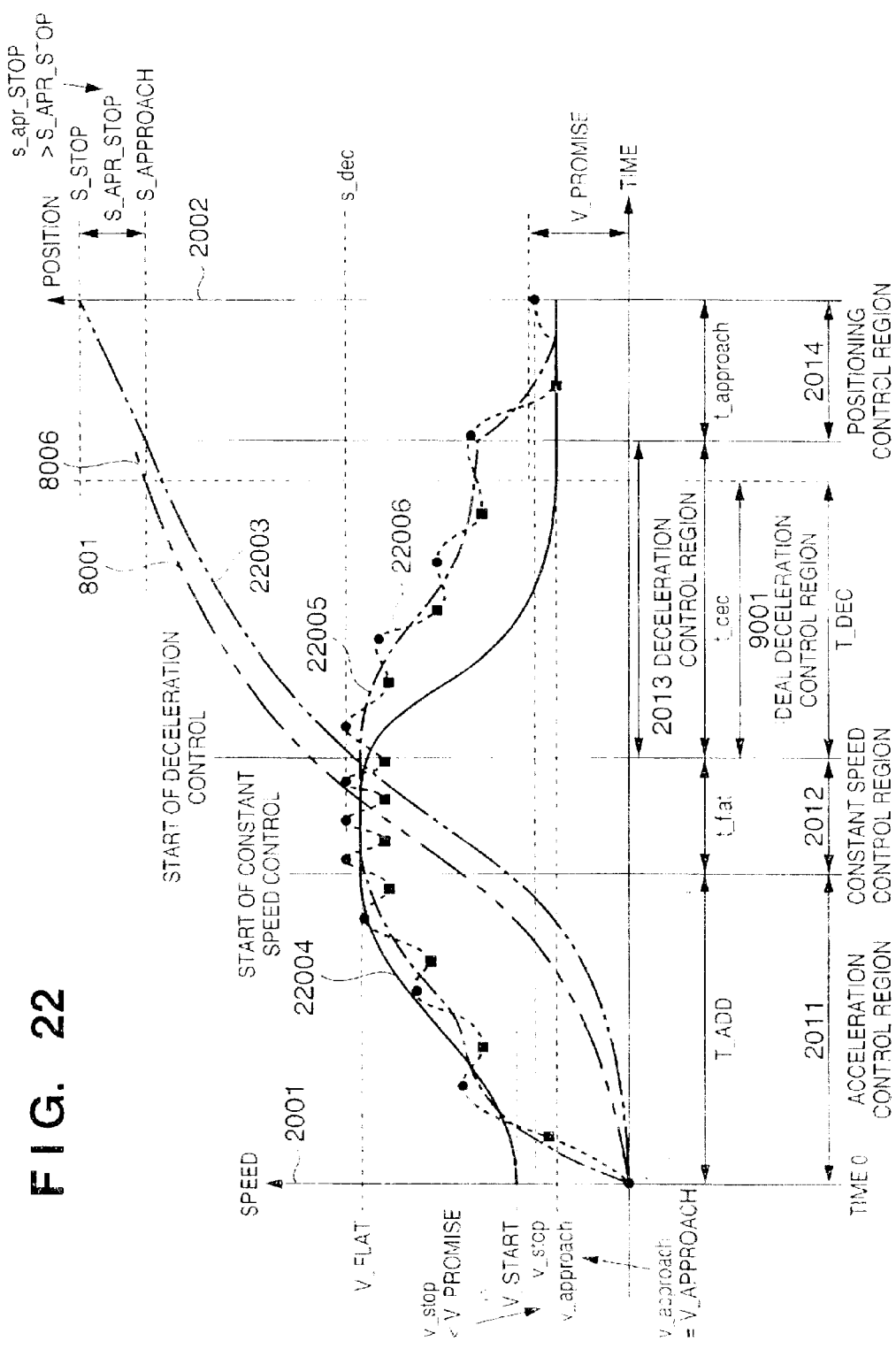
FIG. 22 is a graph showing a drive state after an improving effect by the second embodiment is obtained.

Referring to FIG. 22, the value s_apr_STOP is set to be larger than the corresponding value S_APR_STOP in FIG. 21. On the other hand, the speed v_approach is set to be higher than the speed v_approach in FIG. 21, which is excessively lower than V_APPROACH.

Since the speed v_approach is higher than that in FIG. 21, the problem that the motor stops for an instant in the positioning control region 2014 before the position S_STOP, as shown in FIG. 21, can be avoided.

On the other hand, since the value s_apr_STOP is larger than that in FIG. 21, the length of the positioning control region 2014 increases, so the low-speed driving distance increases. As a result, the position reaches S_STOP after sufficient deceleration, and v_stop<V_PROMISE is achieved.

As described above, as a characteristic feature of this embodiment, if the values t_approach and v_stop cannot be improved only by changing the value v_approach, as in the apparatus of the first embodiment, the moving distance s_apr_STOP in the positioning control region is changed instead without changing the value v_approach.

In an apparatus that employs a digital encoder, generally, an encoder with a high resolution, the cost increases. From the viewpoint of cost reduction, use of an encoder having a relatively low resolution is required. In a low-resolution encoder, the distance between slits is long. Hence, the degree of change in s_apr_STOP in this embodiment becomes coarse. If the degree of change in s_apr_STOP is coarse, the influences on t_approach and v_stop are also coarse. This may make it difficult to execute fine control.

In this embodiment, however, only when improvement by changing v_approach has an adverse influence, improvement is done by changing s_apr_STOP. Hence, a sufficient effect can be expected in use of a low-resolution encoder.

[Third Embodiment]

The third embodiment of the present invention will be described below. In the third embodiment, the DC motor control method of the present invention is applied to control a line feed motor for printing medium conveyance in a serial inkjet printer, as in the first and second embodiments. Parts different from the above embodiments will be mainly described below.

In this embodiment, only drive control preparation processing executed in step S11002 is changed as compared to the second embodiment. The same reference numerals as in the first and second embodiments denote the same parts below, and a description thereof will be omitted.

In the second embodiment, it was not clearly described that values s_apr_STOP and v_approach change between a case wherein a position S_STOP corresponds to a point 1004 corresponding to a phase angle at which the motor itself rotates at a high speed due to the influence of a torque variation caused by cogging and a case wherein the position S_STOP corresponds to a point 1005 corresponding to a phase angle at which the motor itself rotates at a low speed.

However, the characteristic largely changes between the case wherein the position S_STOP corresponds to the point 1004 and the case wherein the position S_STOP corresponds to the point 1005. For this reason, the values s_apr_STOP and v_approach are preferably separately managed. In this embodiment, the values s_apr_STOP and v_approach are separately managed in accordance with a motor phase angle corresponding to S_STOP in driving to be executed. This will be described below.

Figure 23:
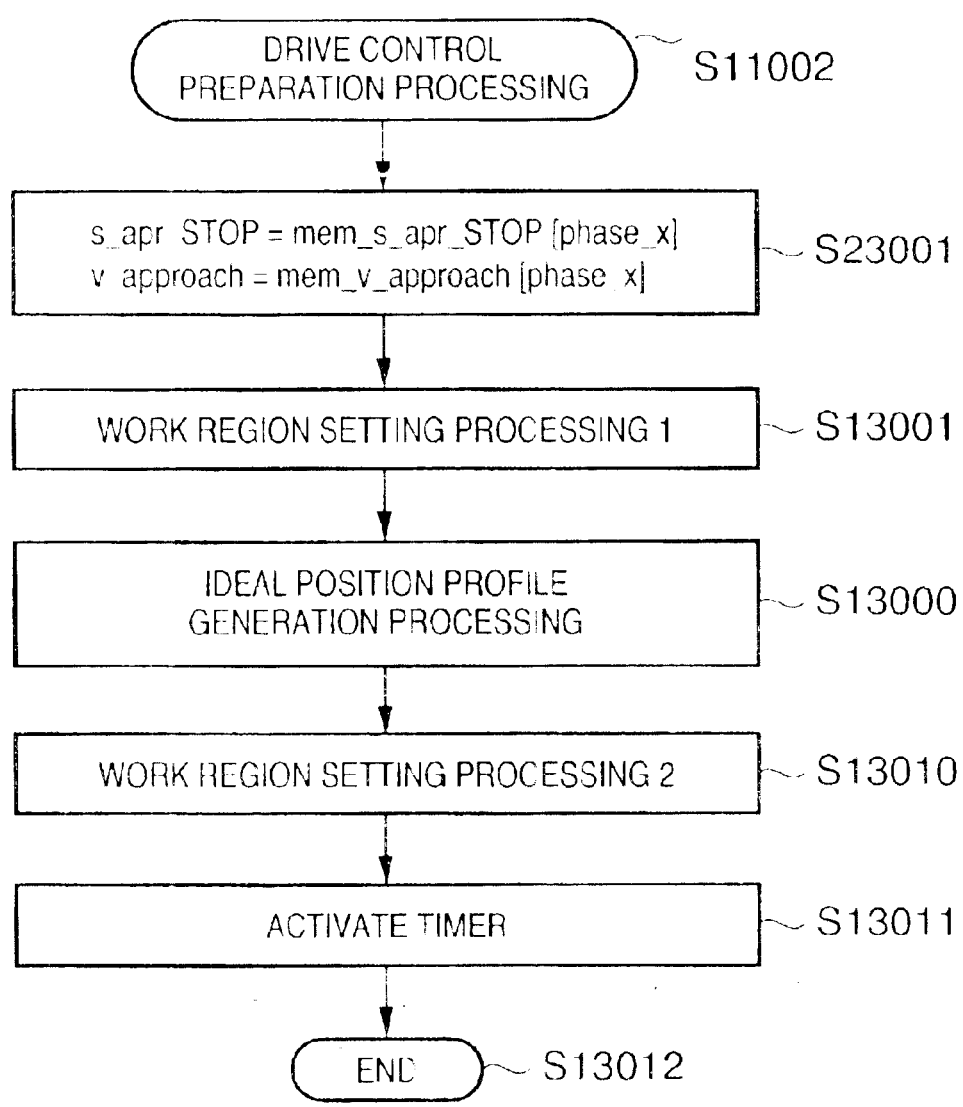
FIG. 23 is a flowchart showing drive control preparation processing of the third embodiment in detail.

FIG. 23 is a flowchart showing drive control preparation processing in step S11002 of this embodiment in detail. In FIG. 23, phase_X is a serial number to access an array uniquely corresponding to the phase angle of the motor. An array mem_s_apr_STOP[phase_X] stores s_apr_STOP when each phase_X is S_STOP. An array mem_v_approach[phase_X] stores v_approach when each phase_X is S_STOP.

In the drive control preparation processing in step S11002 of this embodiment, first, in step S23001, using phase_X uniquely corresponding to S_STOP in driving to be executed, a value is read from a corresponding mem_s_apr_STOP[phase_X] and stored in s_apr_STOP, and a value is read from a corresponding mem_v_approach[phase_X] and stored in v_approach. Processing from step S13001 is the same as in the first embodiment described with reference to FIG. 13, and a description thereof will be omitted.

Figure 24:
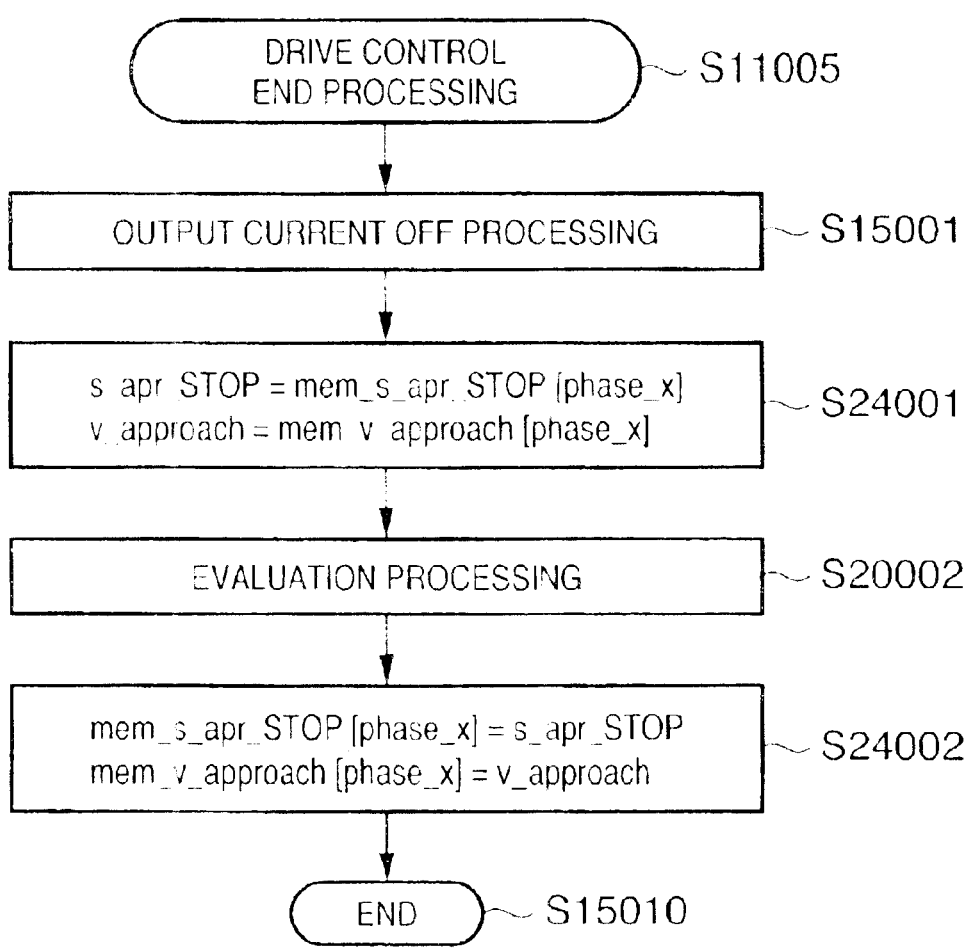
FIG. 24 is a flowchart showing drive control preparation processing of the third embodiment in detail.

FIG. 24 is a flowchart showing drive control preparation processing in step S11005 of this embodiment in detail. In step S24001, using phase_X uniquely corresponding to S_STOP in driving that has been executed, a value is read from a corresponding mem_s_apr_STOP[phase_X] and stored in s_apr_STOP, and a value is read from a corresponding mem_v_approach[phase_X] and stored in v_approach.

After evaluation processing in step S20002 is executed using these values, resultant updated values s_apr_STOP and v_approach are rewritten in the corresponding mem_s_apr_STOP[phase_X] and mem_v_approach[phase_X] in step S24002.

FIGS. 25A to 25D are views for explaining the effect of processing described in FIGS. 23 and 24 in more detail.

Figures 25A, 25B:
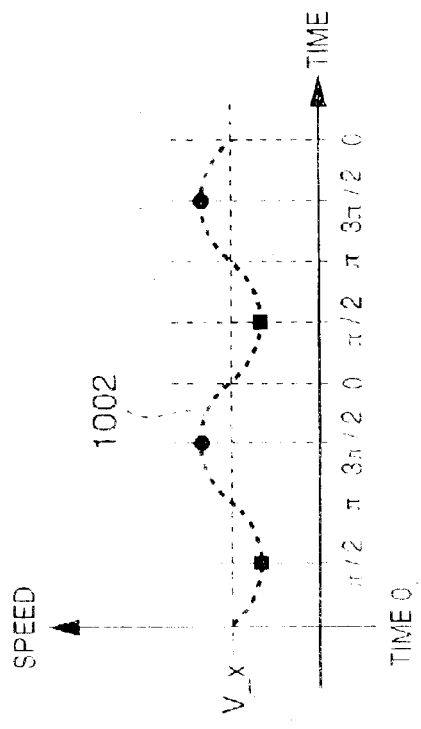
FIGS. 25A to 25D are views for explaining the effect of processing described in FIGS. 23 and 24 in detail.

The graph shown in FIG. 25A and table in FIG. 25B indicate a case wherein although the motor phase angle and encoder read value have no relevance in an unenergized state, the point 1004 corresponds to $3\pi/2$ of the zero-reset encoder read value after power-on.

Figures 25C, 25D:
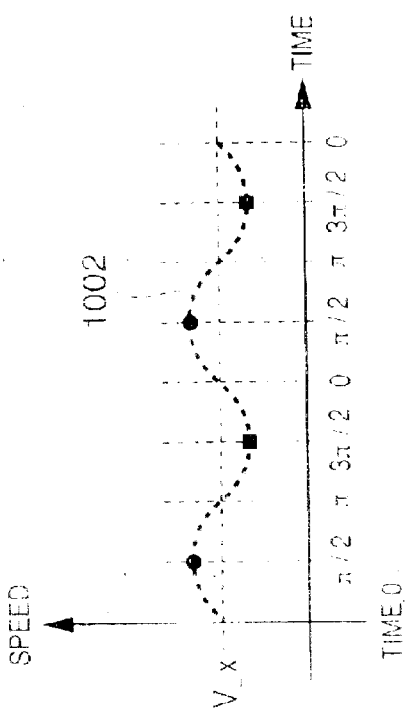

The graph shown in FIG. 25C and table in FIG. 25D indicate a case wherein although the motor phase angle and encoder read value have no relevance in an unenergized state, the point 1005 corresponds to $3\pi/2$ of the zero-reset encoder read value after power-on.

In the unenergized state, since the encoder slit detection interval cannot be stored, the correlation between the immediately preceding motor phase angle and the position read value from the encoder cannot be kept. Even when the motor is moved by a user's manual operation or the like in the unenergized state, the change in correlation between the motor phase angle and the position read value from the encoder cannot be detected because the motion of the encoder cannot be monitored. That is, at the time of power-on, the correlation between the motor phase angle and the position read value from the encoder is undefined.

However, as in this embodiment, when the values s_apr_STOP and v_approach are managed for each phase_X, the difference in characteristic between the values phase_X can be absorbed. In addition, a measure can be taken against the fact that the correlation between the motor phase angle and the position read value from the encoder is undefined at the time of power-on.

That is, an improved value D_1 of s_apr_STOP and an improved value V_1 for phase_X=0 in FIG. 25B equal values corresponding to phase_X=$\pi$ in FIG. 25D. That is, each improved value settles depending on not the value phase_X that is a mere serial number of a sequence but the actual physical phase angle of the motor.

Hence, in this embodiment, even in a general arrangement using a DC motor, in which the encoder slit detection interval cannot be stored in an unenergized state, drive control corresponding to the correlation between the motor phase angle and the position read value from the encoder can be executed. Hence, control that satisfies both the conditions of stop position accuracy and required time can be executed.

[Fourth Embodiment]

The fourth embodiment of the present invention will be described below. In the fourth embodiment, the motor control method of the present invention is applied to control a line feed motor for printing medium conveyance in a serial inkjet printer, as in the above embodiments. Parts different from the above embodiments will be mainly described below.

In this embodiment, only drive control preparation processing executed in step S11002 is changed as compared to the first embodiment. The same reference numerals as in the above embodiments denote the same parts below, and a description thereof will be omitted.

Figure 26A:
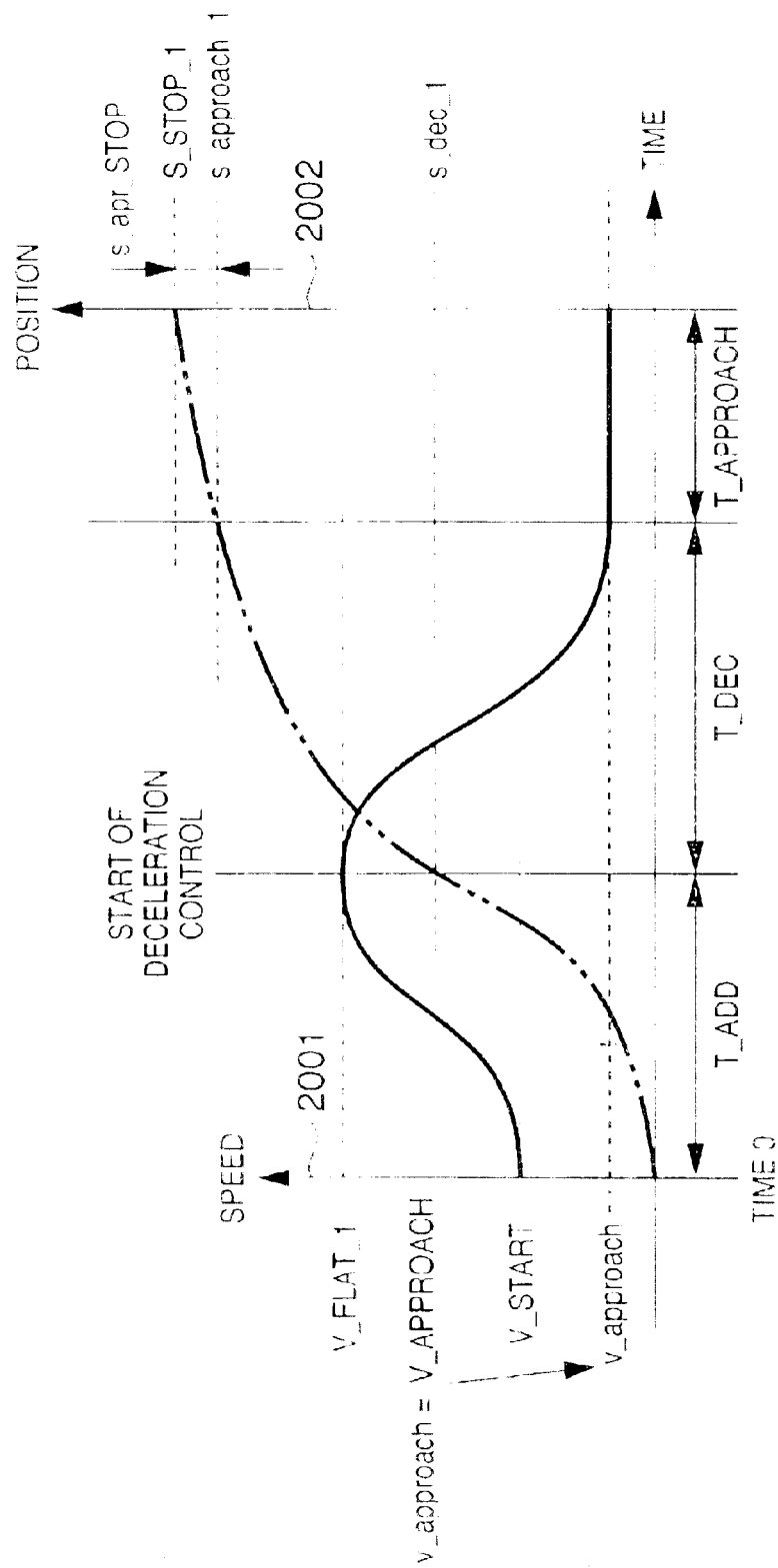
FIGS. 26A and 26B are graphs showing details of a problem to be solved by the fourth embodiment.
Figure 26B:
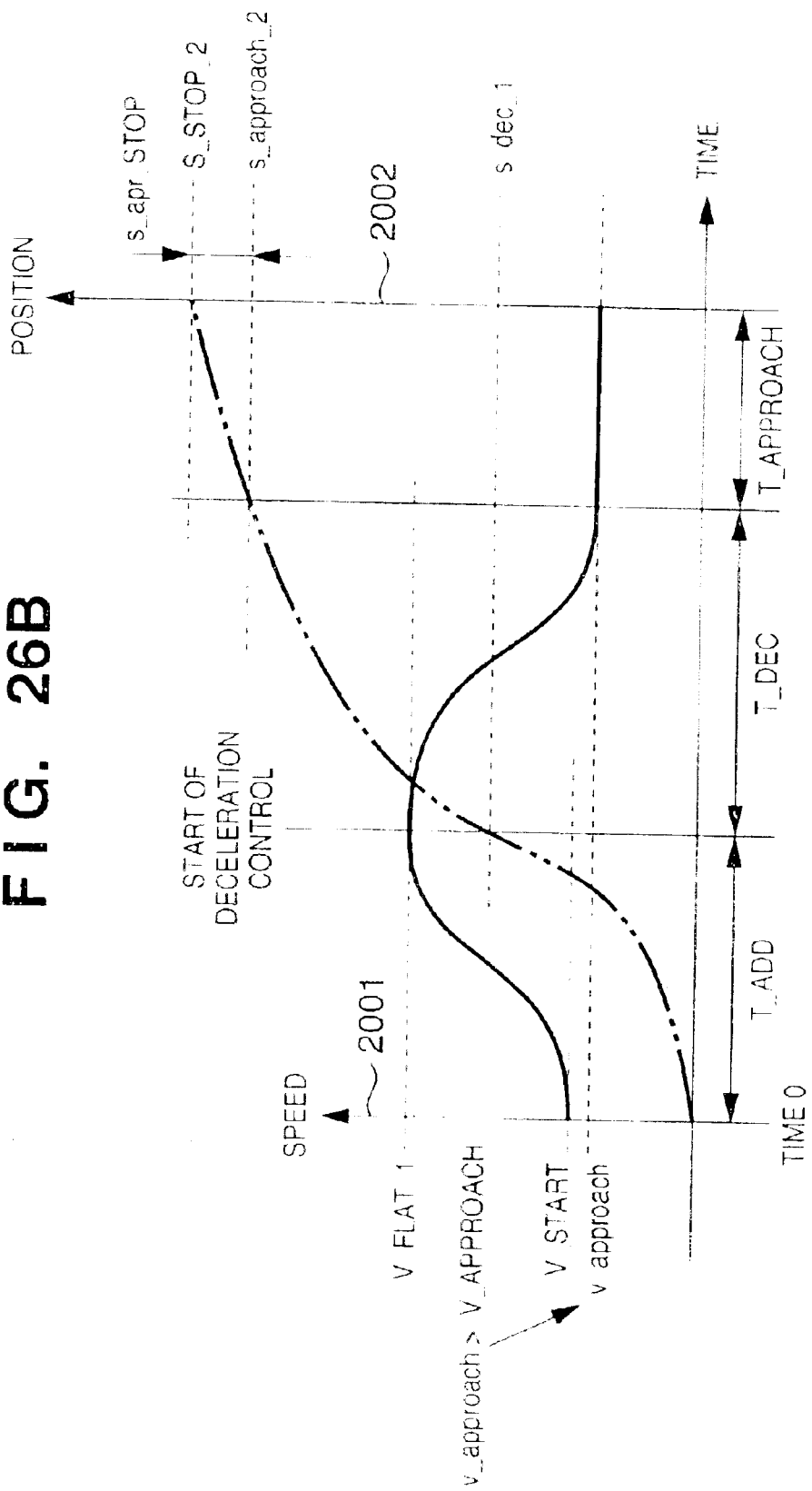

FIGS. 26A and 26B are graphs showing details of a problem to be solved by this embodiment.

FIG. 26A shows a default drive state before the improving effect in the first embodiment is obtained when a length T_FLAT of a constant speed control region 2012 is defined as 0. FIG. 26B shows a drive state after the improving effect in the first embodiment is obtained when the length T_FLAT of the constant speed control region 2012 is defined as 0.

A value v_approach is larger in FIG. 26B than in FIG. 26A. Since the final speed in a deceleration control region 2013 increases, the moving distance in the deceleration control region 2013 increases. That is, although the position when control shifts to the deceleration control region 2013 is kept unchanged at s_dec—1, the position when control shifts to a positioning control region 2014 is larger at s_approach_2 in FIG. 26B than at s_approach_1 in FIG. 26A. Consequently, a stop position S_STOP_2 in FIG. 26B becomes larger than a stop position S_STOP_1 in FIG. 26A.

This means that when the value v_approach is changed by the improving effect, the shortest drive distance that allows driving with the same table changes. The stop position S_STOP_1 that allows driving in FIG. 26A does not allow driving in FIG. 26B. Hence, if the same table should be continuously used, the program logic fails, resulting in hang-up of the system.

This embodiment solves such a problem in the first embodiment.

Figure 26C:
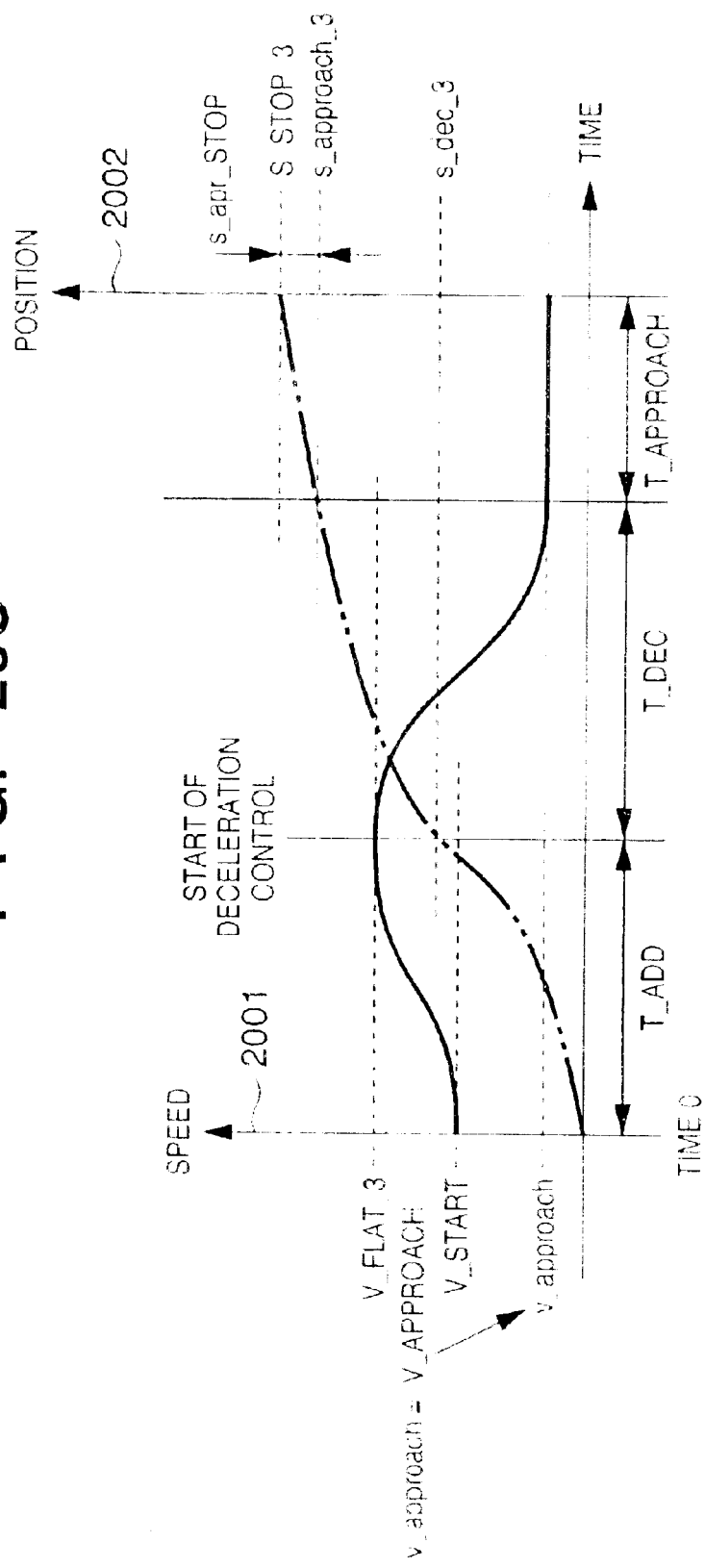
FIG. 26C is a graph showing a state wherein the problem is solved by the fourth embodiment.

In this embodiment, as shown in FIG. 26C, when a different table, e.g., a new table wherein the speed V_FLAT in the constant speed control region 2012 is low (when the speed V_FLAT is defined as V_FLAT_1 in FIG. 26A and V_FLAT_3 in FIG. 26C, V_FLAT_1>V_FLAT_3), is applied, a shortest driving distance S_STOP_3 of the table is shorter than S_STOP_1. Hence, driving can be executed without any problem.

Figure 27:
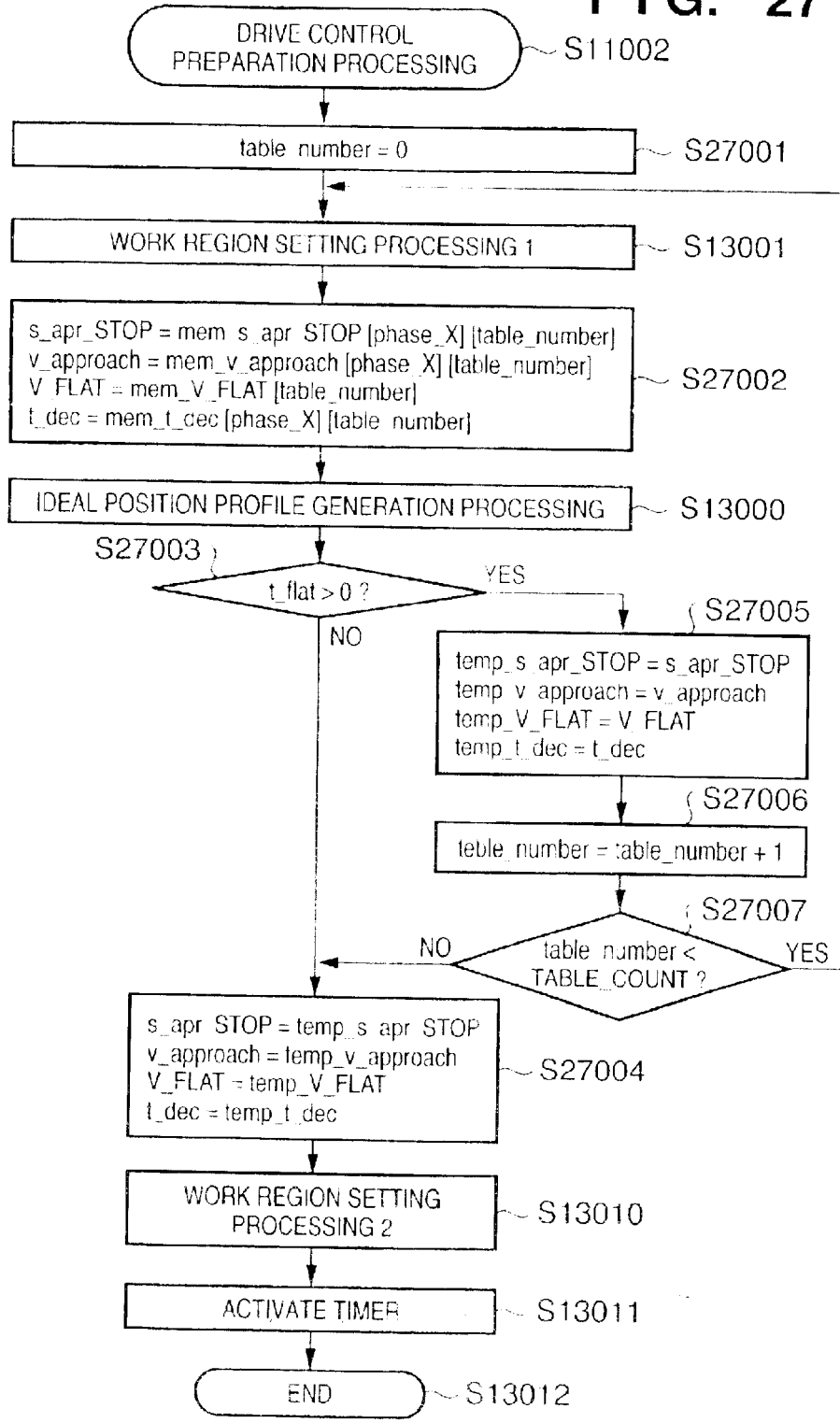
FIG. 27 is a flowchart showing details of drive control preparation processing executed in the fourth embodiment.

FIG. 27 is a flowchart showing processing as a characteristic feature of this embodiment, i.e., a flowchart showing details of drive control preparation processing executed in step S11002.

When processing starts in FIG. 27, a counter table_number for designating a driving table is initialized to 0 in step S27001.

After step S13001, in step S27002, values s_apr_STOP, v_approach, V_FLAT, and t_dec corresponding to corresponding table_number and phase_X are acquired from tables mem_s_apr_STOP[phase_X] [table_number], mem_v_approach[phase_X] [table_number], mem_V_FLAT [table_number], and mem_t_dec[phase_X] [table_number], in which corresponding values are stored.

In mem_V_FLAT[table_number], the larger the table_number is, the larger the stored value is.

An ideal profile is calculated using these values in step S13000. After that, it is determined in step S27003 whether t_flat is larger than 0.

This determination is done to check whether driving with the obtained drive amount is possible in that table. If NO in step S27003, it is determined that the logic fails.

Processing in step S27005 is executed when the logic does not fail. The values s_apr_STOP, v_approach, V_FLAT, and t_dec are stored in work regions temp_s_apr_STOP, temp_v_approach, temp_V_FLAT, and temp_t_dec where temporary values are stored.

In step S27006, the counter table_number is incremented by one. In step S27007, if the counter value table_number is smaller than the total number of tables held in the system, the flow returns to step S13001 to continue processing.

If it is determined in step S27003 that driving with the feed amount is impossible in that table, or when it is determined in step S27007 that determination for all tables held in the system is ended, the values that are temporarily stored are rewritten as information of the table that satisfies the conditions in step S27004.

Processing in steps S13010, S13011, and S13012 is the same as in the first embodiment described with reference to FIG. 13, and a description thereof will be omitted.

According to this embodiment, with the above-described processing, drive control can be executed while employing an appropriate table.

[Other Embodiments]

In the above embodiments, the present invention is applied to control a (line feed) motor for printing medium conveyance in a serial inkjet printer. However, the present invention can be applied not only to an inkjet printer but also to various kinds of devices using motors.

In the above embodiments, the present invention is applied to control a DC motor. However, the present invention can be applied not only to a DC motor but also to any other motor for which feedback control such as tracking control is possible.

Further, the object of the present invention can also be achieved by providing a storage medium storing program codes for performing the aforesaid processes in a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, can be used for providing the program codes.

Furthermore, besides the aforesaid functions according to the above embodiments being realized by executing the program codes which are read by a computer, the present invention includes a case where an OS (operating system) or the like working on the computer performs a part of or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part of or entire processes in accordance with designations of the program codes and realizes functions of the above embodiments.

If the present invention is realized as a storage medium, program codes corresponding to the above mentioned flowcharts (FIGS. 11, 13 to 15, 20, 23, 24 and/or FIG. 27) are to be stored in the storage medium.

As many apparently widely different embodiments of the present invention can be made without departing from the spirit and scope thereof, it is to be understood that the invention is not limited to the specific embodiments thereof except as defined in the appended claims.

What is claimed is:

1. A motor control method in a device which drives a mechanism using a motor as a power source, comprising:
   a setting step of setting a driving parameter for the motor;
   a profile generation step of, in executing driving of the motor, generating a position profile and a speed profile of the driving in accordance with a target position and the driving parameter set in said setting step;
   a tracking control step of controlling the driving of the motor by dividing the driving into a plurality of regions including an acceleration region, a deceleration region and a positioning region and driving the motor in the acceleration region and the deceleration region in accordance with the position profile and driving the motor in the positioning region in accordance with the speed profile;
   an evaluation step of, at an end of the driving, evaluating the driving parameter by using a result of actual driving and a predetermined value; and
   a changing step of changing the driving parameter used in the positioning region in accordance with a result of evaluation.

2. The method according to claim 1, wherein the driving parameter includes a speed in the positioning region, and a moving distance of the positioning region, and
   in said evaluation step, it is determined whether a difference between an actual required time and a predetermined required time of the positioning region is larger than a predetermined value, and if it is determined that the difference is larger than the predetermined value, at least one of the speed and the moving distance is changed in said changing step.

3. The method according to claim 1, wherein, if it is determined in said evaluation step that a difference between an actual required time and a predetermined required time of the positioning region is larger than the predetermined value, the speed is changed in said changing step, and if the changed speed is smaller than a predetermined threshold value, the speed is returned to an initial value, and the moving distance is changed.

4. A motor control apparatus for driving a mechanism using a motor as a power source, comprising:
   setting means for setting a driving parameter for the motor;
   profile generation means for, in executing driving of the motor, generating a position profile and a speed profile of the driving in accordance with a target position and the driving parameter set by said setting means;
   tracking control means for controlling the driving of the motor by dividing the driving into a plurality of regions including an acceleration region, a deceleration region and a positioning region and driving the motor in the acceleration region and the deceleration region in accordance with the position profile and driving the motor in the positioning region in accordance with the speed profile;
   evaluation means for, at an end of the driving, evaluating the driving parameter by using a result of actual driving and a predetermined value; and
   changing means for changing the driving parameter used in the positioning region in accordance with a result of evaluation.

5. The apparatus according to claim 4, wherein the driving parameter includes a speed in the positioning region, and a moving distance of the positioning region, and
   said evaluation means determines whether a difference between an actual required time and a predetermined required time of the positioning region is larger than a predetermined value, and upon determining that the difference is larger than the predetermined value, said changing means changes at least one of the speed and the moving distance.

6. The apparatus according to claim 4, wherein upon determining that a difference between an actual required time and a predetermined required time of the positioning region is larger than the predetermined value, said changing means changes the speed, and if the changed speed is smaller than a predetermined threshold value, said changing means returns the speed to an initial value and changes the moving distance.

7. The apparatus according to claim 4, further comprising encoder means, and wherein said tracking control means controls the driving of the motor based on an output from said encoder means.

8. The apparatus according to claim 7, further comprising storage means, and wherein the motor is a DC motor and the encoder means is a rotary encoder, and said storage means stores the driving parameter corresponding to a phase angle of the DC motor at which the mechanism stops when the driving is completed.

9. The apparatus according to claim 8, wherein the driving parameter includes a speed and a driving distance in the positioning region.

10. The apparatus according to claim 8, wherein one period of torque ripple of the DC motor due to cogging is regarded as 360 degrees of the phase angle of the motor.

11. The apparatus according to claim 4, wherein said setting means sets an initial value of the driving parameter at a predetermined timing.

12. The apparatus according to claim 4, further comprising second changing means for changing the speed profile in accordance with the result of the evaluation.

13. An electronic device having a motor control apparatus for driving a mechanism using a motor as a power source, said apparatus comprising:

setting means for setting a driving parameter for the motor;

profile generation means for, in executing driving of the motor, generating a position profile and a speed profile of the driving in accordance with a target position and the driving parameter set by said setting means;

tracking control means for controlling the driving of the motor by dividing the driving into a plurality of regions including an acceleration region, a deceleration region and a positioning region and driving the motor in the acceleration region and the deceleration region in accordance with the position profile and driving the motor in the positioning region in accordance with the speed profile;

evaluation means for, at an end of the driving, evaluating the driving parameter by using a result of actual driving and a predetermined value; and changing means for changing the driving parameter used in the positioning region in accordance with a result of evaluation.

14. A printing apparatus using a motor control apparatus for conveying a printing medium using a motor as a power source, said apparatus comprising:

setting means for setting a driving parameter for the motor;

profile generation means for, in executing driving of the motor, generating a position profile and a speed profile of the driving in accordance with a target position and the driving parameter set by said setting means;

tracking control means for controlling the driving of the motor by dividing the driving into a plurality of regions including an acceleration region, a deceleration region and a positioning region and driving the motor in the acceleration region and the deceleration region in accordance with the position profile and driving the motor in the positioning region in accordance with the speed profile;

evaluation means for, at an end of the driving, evaluating the driving parameter by using a result of actual driving and a predetermined value; and changing means for changing the driving parameter used in the positioning region in accordance with a result of evaluation.

* * * * *